United States Patent
Shunock et al.

(10) Patent No.: US 11,042,912 B2
(45) Date of Patent: Jun. 22, 2021

(54) SYSTEM AND METHOD FOR MANAGING INTERACTION BETWEEN COMMERCIAL AND INTERMEDIARY USERS

(71) Applicant: Michael Stewart Shunock, Toronto (CA)

(72) Inventors: Michael Stewart Shunock, Toronto (CA); Linda Arhin, Toronto (CA)

(73) Assignee: Michael Stewart Shunock, Toronto (CA)

( * ) Notice: Subject to any disclaimer, the term of this patent is extended or adjusted under 35 U.S.C. 154(b) by 489 days.

(21) Appl. No.: 15/599,803

(22) Filed: May 19, 2017

(65) Prior Publication Data

US 2017/0337592 A1 Nov. 23, 2017

Related U.S. Application Data

(63) Continuation of application No. PCT/CA2015/051225, filed on Nov. 24, 2015.

(Continued)

(51) Int. Cl.
*G06Q 10/00* (2012.01)
*G06Q 30/02* (2012.01)
*H04L 12/58* (2006.01)

(52) U.S. Cl.
CPC ......... *G06Q 30/0281* (2013.01); *G06Q 30/02* (2013.01); *G06Q 30/0242* (2013.01); *H04L 51/34* (2013.01)

(58) Field of Classification Search
CPC .......... G06Q 30/0643; G06Q 30/0601; G06Q 10/0833; G06Q 30/0631; G06Q 30/0207;

(Continued)

(56) References Cited

U.S. PATENT DOCUMENTS 7,478,054 B1   1/2009  Adams et al.
8,521,688 B1 * 8/2013  Belwadi ................. G06Q 30/02
                                                  707/622

(Continued)

OTHER PUBLICATIONS

Yuanfu Ji, Du Zhang and M. Lu, "Multi-level filters for a Web-based e-mail system," Proceedings of the 2004 IEEE International Conference on Information Reuse and Integration, 2004. IRI 2004., Las Vegas, NV, USA, 2004, pp. 109-114, doi: 10.1109/IRI.2004. 1431445.*

(Continued)

*Primary Examiner* — Gabrielle A McCormick
(74) *Attorney, Agent, or Firm* — Bereskin & Parr LLP/S.E.N.C.R.L., s.r.l.

(57) ABSTRACT

A method, system, and computer program product allow employee agents of an employer company to selectively communicate with potential customers to share content regarding various products and services offered by the employer company. In one aspect, a plurality of product records and a plurality of intermediary user records, storing information about the products/services offered by the company and the employee agents of the company, respectively, are stored on a data storage module. To send message to recipients, an employee agent may select one or more products, one or more recipients, and send messages having information about the selected products to the selected recipients. The employer company may retrieve tracking information regarding these sent messages via a message tracking module. The system may also include a message sending module that may intelligently send messages to requested recipients and a message processing module to track interactions of the recipients with the messages.

23 Claims, 19 Drawing Sheets

Related U.S. Application Data

(60) Provisional application No. 62/157,159, filed on May 5, 2015, provisional application No. 62/084,254, filed on Nov. 25, 2014.

(58) Field of Classification Search
CPC ........... G06Q 30/0613; G06Q 30/0214; G06Q 30/0281; G06Q 30/02; G06Q 30/0242; G06F 16/90335; H04L 51/34
See application file for complete search history.

(56) References Cited

U.S. PATENT DOCUMENTS

| | | | | |
|---|---|---|---|---|
| 2002/0077998 | A1* | 6/2002 | Andrews | G06Q 30/02 |
| 2004/0143473 | A1* | 7/2004 | Tivey | G06Q 10/0631 |
| | | | | 705/1.1 |
| 2007/0027746 | A1* | 2/2007 | Grabowich | G06Q 30/0605 |
| | | | | 705/14.4 |
| 2008/0255934 | A1* | 10/2008 | Leventhal | G06Q 30/02 |
| | | | | 705/14.16 |
| 2009/0254971 | A1* | 10/2009 | Herz | G06Q 30/02 |
| | | | | 726/1 |
| 2010/0017260 | A1* | 1/2010 | Hamilton, II | G06Q 30/08 |
| | | | | 705/14.4 |
| 2010/0042471 | A1 | 2/2010 | Chang et al. | |
| 2011/0208572 | A1 | 8/2011 | Ladd et al. | |
| 2012/0158477 | A1 | 6/2012 | Tennenholtz st al. | |
| 2013/0204740 | A1 | 8/2013 | Barbieri et al. | |
| 2015/0067055 | A1 | 3/2015 | Khera et al. | |

OTHER PUBLICATIONS

M. Garuba, J. Li and L. Burge, "Comparative Analysis of Email Filtering Technologies," Fourth International Conference on Information Technology (ITNG'07), Las Vegas, NV, USA, 2007, pp. 785-789, doi: 10.1109/ITNG.2007.52.*

International Preliminary Report on Patentability (IPRP) of corresponding PCT/CA2015/051225 dated May 30, 2017.

Written Opinion of the International Searching Authority and International Search Report for PCT/CA2015/051225 dated Mar. 1, 2016.

Office Action dated Oct. 21, 2019 in respect of U.S. Appl. No. 15/599,782.

* cited by examiner

SYSTEM AND METHOD FOR MANAGING INTERACTION BETWEEN COMMERCIAL AND INTERMEDIARY USERS

RELATED APPLICATIONS

This application is a continuation of PCT Patent Application No. PCT/CA2015/051225 filed on Nov. 24, 2015, entitled "SYSTEM AND METHOD FOR MANAGING INTERACTION BETWEEN COMMERCIAL AND INTERMEDIARY USERS" which claims priority from the U.S. Provisional Patent Application Nos. 62/084,254 filed on Nov. 25, 2014; and 62/157,159 filed on May 5, 2015. The entirety of the contents of the PCT Patent Application No. PCT/CA2015/051225 and the U.S. Provisional Patent Application Nos. 62/084,254 and 62/157,159 are herein incorporated by reference.

FIELD

The present invention relates generally to managing interaction between commercial and intermediary users.

BACKGROUND

Computer implemented and more specifically Internet implemented methods of distributing advertising content are known.

SUMMARY

In accordance with an aspect of an embodiment of the invention, there is provided a method of operating at least one computer server. The method comprises: configuring a processor of the at least one computer server to authenticate a commercial user; storing a plurality of product records on the data storage module, wherein the plurality of product records stores information regarding a plurality of products such that for each product in the plurality of products, a corresponding product record in the plurality of product records stores information regarding that product; storing a plurality of intermediary user records on the data storage module for the commercial user, wherein the plurality of intermediary user records stores information regarding a plurality of intermediary users such that for each intermediary user in the plurality of intermediary users, a corresponding intermediary user record in the plurality of intermediary user records stores information regarding that intermediary user; configuring the processor of the at least one computer server to provide a message sending module operable by the plurality of intermediary users to send a plurality of product messages to a plurality of recipients such that for each intermediary user in the plurality of intermediary users, the message sending module is operable by that intermediary user to i) select at least one selected product record from the plurality of product records, ii) specify recipient electronic contact information for at least one selected recipient in the plurality of recipients, and iii) send a product message comprising product information derived from the at least one selected product record to the at least one selected recipient, wherein the plurality of product messages includes that product message; and configuring the processor to provide a message tracking module operable by the commercial user via a commercial user device for that commercial user, the message tracking module being operable by the commercial user to provide tracking information regarding the plurality of product messages via the commercial user device, wherein the tracking information is derived from each message in the plurality of product messages.

In accordance with a further aspect of an embodiment of the invention, the message tracking module comprises a product message tracking window, the processor being further configured to display the product message tracking window on a commercial user display of the commercial user device; and the message tracking module being operable to display the tracking information by, in response to the commercial user interacting with the product message tracking window, i) displaying a plurality of product designators via a commercial user interface on the commercial user display, wherein each product designator in the plurality of product designators designates a product record in the plurality of product records, ii) receiving at least one commercial user interaction with a queried product designator in the plurality of product designators, iii) in response to receiving the at least one commercial user interaction, displaying queried product information for the product record designated by the queried product designator via the commercial user display, wherein the queried product information is derived from a number of product messages in the plurality of product messages wherein each message in the number of queried product messages includes product information derived from the product record, the number of queried product messages being zero or a positive integer less than a cardinality of the plurality of product messages.

In accordance with a further aspect of an embodiment of the invention, the message tracking module comprises an intermediary message tracking window, the processor being further configured to display the intermediary message tracking window via a commercial user interface on a commercial user display of the commercial user device; and the message tracking module being operable to display the tracking information by, in response to the commercial user interacting with the intermediary message tracking window i) displaying a plurality of intermediary user designators via a commercial user interface on the commercial user display, wherein each intermediary user designator in the plurality of intermediary user designators designates an intermediary user record in the plurality of intermediary user records and an intermediary user in the plurality of intermediary users, wherein the intermediary user record stores information regarding the intermediate user, ii) receiving at least one commercial user interaction with a queried intermediary user designator in the plurality of intermediary user designators, iii) in response to receiving the at least one commercial user interaction, displaying queried intermediary user information for the intermediary user designated by the queried intermediary user designator via the commercial user display, wherein the queried intermediary user information is derived from a number of queried intermediary user messages in the plurality of product messages wherein each message in the number of queried intermediary user messages is sent by the intermediary user, the number of queried intermediary user messages being zero or a positive integer less than a cardinality of the plurality of product messages.

In accordance with a further aspect of an embodiment of the invention, the tracking information comprises, for each message in the plurality of product messages, an identity of the intermediary user that sent that product message, and at least one of the product information derived from the at least one selected product record, and the recipient electronic contact information for the at least one selected recipient.

In accordance with a further aspect of an embodiment of the invention, the method further comprises configuring the processor to display a product control window via the commercial user interface on the commercial user display, wherein the product control window is controllable by the commercial user to modify the plurality of product records according to at least one interaction of the commercial user with the product control window.

In accordance with a further aspect of an embodiment of the invention, to modify the plurality of product records according to the at least one interaction of the commercial user with the product control window includes at least one of: a) to add to the plurality of product records by adding a newly approved product record to the plurality of product records, wherein the newly approved product record stores information regarding a newly approved product and the newly approved product is added to the plurality of products when the newly approved product record is added to the plurality of product records; and b) to remove a formerly approved product record from the plurality of product records, wherein the formerly approved product record stores information regarding a formerly approved product and the formerly approved product is removed from the plurality of products when the formerly approved product record is removed from the plurality of product records.

In accordance with a further aspect of an embodiment of the invention, the method further comprises configuring the processor to display an intermediary control window via the commercial user interface on the commercial user display, wherein the intermediary control window is controllable by the commercial user to modify the plurality of intermediary user records according to at least one interaction of the commercial user with the intermediary control window.

In accordance with a further aspect of an embodiment of the invention, to modify the plurality of intermediary user records according to the at least one interaction of the commercial user with the intermediary control window includes at least one of: a) to add to the plurality of intermediary user records by adding a newly approved intermediary user record to the plurality of intermediary user records, wherein the newly approved intermediary user record stores information regarding a newly approved intermediary user and the newly approved intermediary user is added to the plurality of intermediary users when the newly approved intermediary user record is added to the plurality of intermediary user records; and b) to remove a formerly approved intermediary user record from the plurality of intermediary user records, wherein the formerly approved intermediary user record stores information regarding a formerly approved intermediary user and the formerly approved intermediary user is removed from the plurality of intermediary users when the formerly approved intermediary user record is removed from the plurality of intermediary user records.

In accordance with a further aspect of an embodiment of the invention, the method further comprises configuring the processor of the at least one computer server to provide a message processing module for monitoring interactions of the plurality of recipients with the plurality of product messages, wherein in response to an interaction between an interested recipient in the plurality of recipients and a corresponding product message in the plurality of product messages, the message processing module is operable to: a) ascertain at least one of: i) a product identifier linked to a product record in the plurality of product records, wherein the corresponding product message includes product information derived from that product record; and ii) an intermediary user identifier linked to an intermediary user in the plurality of intermediary users, wherein the corresponding product message is sent by the intermediary user; and b) store an indication of the interested recipient on the data storage module in relation to at least one of the product identifier and the intermediary user identifier, wherein the tracking information regarding the plurality of product messages depends, at least in part, on the indication of the interested recipient.

In accordance with a further aspect of an embodiment of the invention, the plurality of product messages includes one or more downstream product messages, wherein each product message in the one or more downstream product messages is sent by a direct recipient in one or more direct recipients to a downstream recipient in one or more downstream recipients, wherein the plurality of recipients includes the one or more direct recipients and the one or more downstream recipients, and the direct recipient is not in the one or more downstream recipients.

In accordance with a further aspect of an embodiment of the invention, the plurality of intermediary users includes one or more expert system intermediary users, wherein each expert system intermediary user in the one or more expert system intermediary users is an external computer implemented component that communicates with the at least one computer server via an intermediary communication module of the at least one computer server.

In accordance with an aspect of an embodiment of the invention, there is provided a commercial user audit system comprising: a) a data storage module having stored thereon: a plurality of product records, wherein the plurality of product records stores information regarding a plurality of products such that for each product in the plurality of products, a corresponding product record in the plurality of product records stores information regarding that product; and a plurality of intermediary user records for the commercial user, wherein the plurality of intermediary user records stores information regarding a plurality of intermediary users such that for each intermediary user in the plurality of intermediary users, a corresponding intermediary user record in the plurality of intermediary user records stores information regarding that intermediary user; and b) a hardware processor unit being configured for: providing an authentication module for authenticating the commercial user; providing a message sending module operable by the plurality of intermediary users to send a plurality of product messages to a plurality of recipients such that for each intermediary user in the plurality of intermediary users, the message sending module is operable by that intermediary user to i) select at least one selected product record from the plurality of product records, ii) specify recipient electronic contact information for at least one selected recipient in the plurality of recipients, and iii) send a product message comprising product information derived from the at least one selected product record to the at least one selected recipient, wherein the plurality of product messages includes that product message; and providing a message tracking module operable by the commercial user via a commercial user device for that commercial user, the message tracking module being operable by the commercial user to provide tracking information regarding the plurality of product messages via the commercial user device, wherein the tracking information is derived from each message in the plurality of product messages.

In accordance with a further aspect of an embodiment of the invention, the message tracking module comprises a product message tracking window, the processor being further configured to display the product message tracking window on a commercial user display of the commercial user device; and the message tracking module being operable to display the tracking information by, in response to the commercial user interacting with the product message tracking window, i) displaying a plurality of product designators via a commercial user interface on the commercial user display, wherein each product designator in the plurality of product designators designates a product record in the plurality of product records, ii) receiving at least one commercial user interaction with a queried product designator in the plurality of product designators, iii) in response to receiving the at least one commercial user interaction, displaying queried product information for the product record designated by the queried product designator via the commercial user display, wherein the queried product information is derived from a number of product messages in the plurality of product messages wherein each message in the number of queried product messages includes product information derived from the product record, the number of queried product messages being zero or a positive integer less than a cardinality of the plurality of product messages.

In accordance with a further aspect of an embodiment of the invention, the message tracking module comprises an intermediary message tracking window, the processor being further configured to display the intermediary message tracking window via a commercial user interface on a commercial user display of the commercial user device; and the message tracking module being operable to display the tracking information by, in response to the commercial user interacting with the intermediary message tracking window i) displaying a plurality of intermediary user designators via a commercial user interface on the commercial user display, wherein each intermediary user designator in the plurality of intermediary user designators designates an intermediary user record in the plurality of intermediary user records and an intermediary user in the plurality of intermediary users, wherein the intermediary user record stores information regarding the intermediate user, ii) receiving at least one commercial user interaction with a queried intermediary user designator in the plurality of intermediary user designators, iii) in response to receiving the at least one commercial user interaction, displaying queried intermediary user information for the intermediary user designated by the queried intermediary user designator via the commercial user display, wherein the queried intermediary user information is derived from a number of queried intermediary user messages in the plurality of product messages wherein each message in the number of queried intermediary user messages is sent by the intermediary user, the number of queried intermediary user messages being zero or a positive integer less than a cardinality of the plurality of product messages.

In accordance with a further aspect of an embodiment of the invention, the tracking information comprises, for each message in the plurality of product messages, an identity of the intermediary user that sent that product message, and at least one of the product information derived from the at least one selected product record, and the recipient electronic contact information for the at least one selected recipient.

In accordance with a further aspect of an embodiment of the invention, the hardware processor unit is further configured for displaying a product control window via the commercial user interface on the commercial user display, wherein the product control window is controllable by the commercial user to modify the plurality of product records according to at least one interaction of the commercial user with the product control window.

In accordance with a further aspect of an embodiment of the invention, to modify the plurality of product records according to the at least one interaction of the commercial user with the product control window includes at least one of: a) to add to the plurality of product records by adding a newly approved product record to the plurality of product records, wherein the newly approved product record stores information regarding a newly approved product and the newly approved product is added to the plurality of products when the newly approved product record is added to the plurality of product records; and b) to remove a formerly approved product record from the plurality of product records, wherein the formerly approved product record stores information regarding a formerly approved product and the formerly approved product is removed from the plurality of products when the formerly approved product record is removed from the plurality of product records.

In accordance with a further aspect of an embodiment of the invention, the hardware processor unit is further configured for displaying an intermediary control window via the commercial user interface on the commercial user display, wherein the intermediary control window is controllable by the commercial user to modify the plurality of intermediary user records according to at least one interaction of the commercial user with the intermediary control window.

In accordance with a further aspect of an embodiment of the invention, to modify the plurality of intermediary user records according to the at least one interaction of the commercial user with the intermediary control window includes at least one of: a) to add to the plurality of intermediary user records by adding a newly approved intermediary user record to the plurality of intermediary user records, wherein the newly approved intermediary user record stores information regarding a newly approved intermediary user and the newly approved intermediary user is added to the plurality of intermediary users when the newly approved intermediary user record is added to the plurality of intermediary user records; and b) to remove a formerly approved intermediary user record from the plurality of intermediary user records, wherein the formerly approved intermediary user record stores information regarding a formerly approved intermediary user and the formerly approved intermediary user is removed from the plurality of intermediary users when the formerly approved intermediary user record is removed from the plurality of intermediary user records.

In accordance with a further aspect of an embodiment of the invention, the hardware processor unit is further configured for providing a message processing module for monitoring interactions of the plurality of recipients with the plurality of product messages, wherein in response to an interaction between an interested recipient in the plurality of recipients and a corresponding product message in the plurality of product messages, the message processing module is operable to: a) ascertain at least one of i) a product identifier linked to a product record in the plurality of product records, wherein the corresponding product message includes product information derived from that product record; and ii) an intermediary user identifier linked to an intermediary user in the plurality of intermediary users, wherein the corresponding product message is sent by the intermediary user; and b) store an indication of the interested recipient on the data storage module in relation to at least one of the product identifier and the intermediary user identifier, wherein the tracking information regarding the plurality of product messages depends, at least in part, on the indication of the interested recipient.

In accordance with a further aspect of an embodiment of the invention, the plurality of product messages includes one or more downstream product messages, wherein each product message in the one or more downstream product messages is sent by a direct recipient in one or more direct recipients to a downstream recipient in one or more downstream recipients, wherein the plurality of recipients includes the one or more direct recipients and the one or more downstream recipients, and the direct recipient is not in the one or more downstream recipients.

In accordance with a further aspect of an embodiment of the invention, the plurality of intermediary users includes one or more expert system intermediary users, wherein each expert system intermediary user in the one or more expert system intermediary users is an external computer implemented component that communicates with the at least one computer server via an intermediary communication module of the at least one computer server.

In accordance with an aspect of an embodiment of the invention, there is provided a computer program product for use on a server having a data storage module. The computer program product comprises: a non-transitory recording medium; and instructions recorded on the non-transitory recording medium for instructing the at least one computer server to perform the steps of: authenticating a commercial user; storing a plurality of product records on the data storage module, wherein the plurality of product records stores information regarding a plurality of products such that for each product in the plurality of products, a corresponding product record in the plurality of product records stores information regarding that product; storing a plurality of intermediary user records on the data storage module for the commercial user, wherein the plurality of intermediary user records stores information regarding a plurality of intermediary users such that for each intermediary user in the plurality of intermediary users, a corresponding intermediary user record in the plurality of intermediary user records stores information regarding that intermediary user; providing a message sending module operable by the plurality of intermediary users to send a plurality of product messages to a plurality of recipients such that for each intermediary user in the plurality of intermediary users, the message sending module is operable by that intermediary user to i) select at least one selected product record from the plurality of product records, ii) specify recipient electronic contact information for at least one selected recipient in the plurality of recipients, and iii) send a product message comprising product information derived from the at least one selected product record to the at least one selected recipient, wherein the plurality of product messages includes that product message; and providing a message tracking module operable by the commercial user via a commercial user device for that commercial user, the message tracking module being operable by the commercial user to provide tracking information regarding the plurality of product messages via the commercial user device, wherein the tracking information is derived from each message in the plurality of product messages.

BRIEF DESCRIPTION OF THE DRAWINGS

The features of the invention will become more apparent in the following detailed description in which reference is made to the appended drawings wherein.

DETAILED DESCRIPTION

Figure 1:
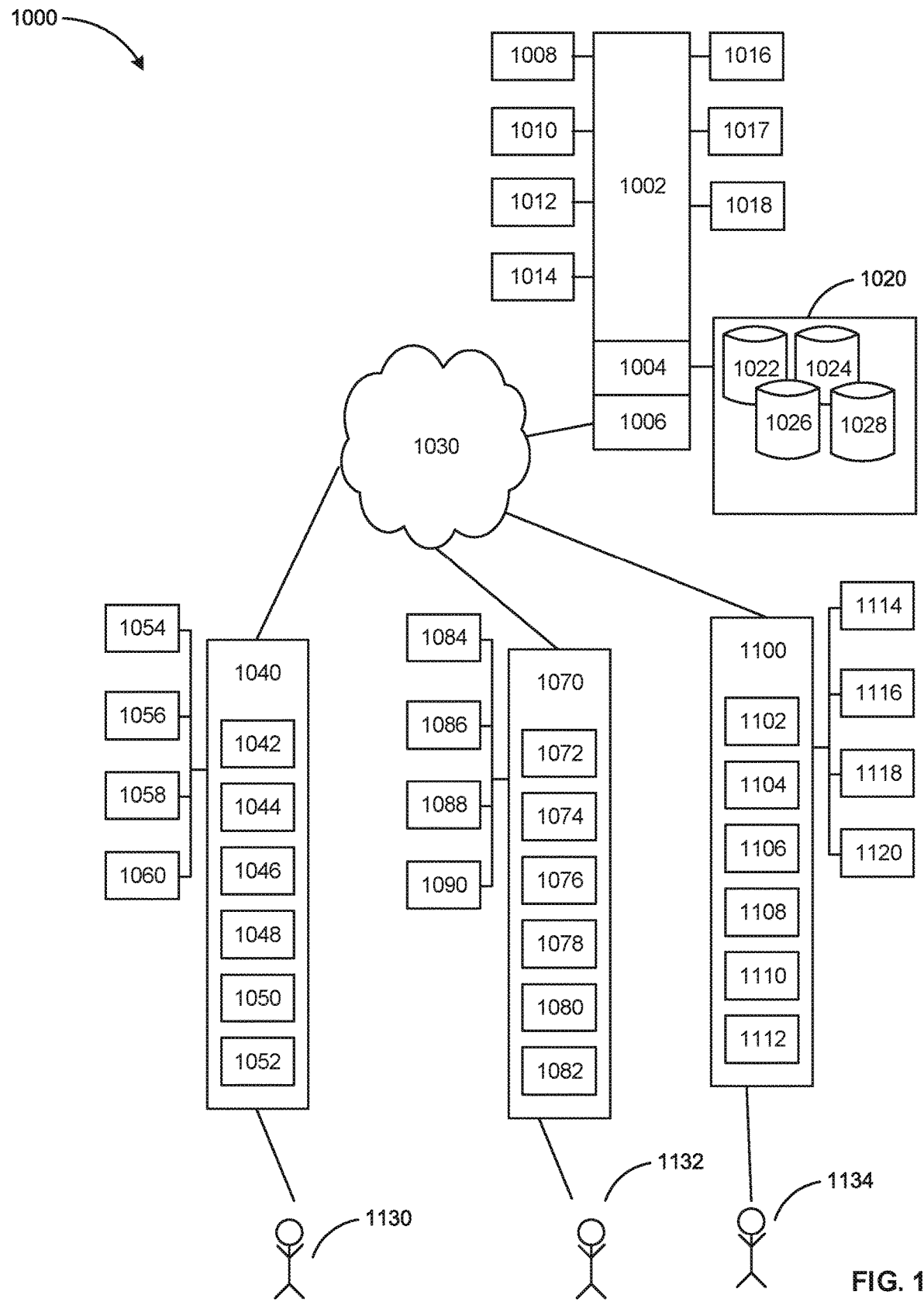
FIG. 1 is a block diagram of a messaging system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, component, server, computer, terminal, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

System Overview

Referring to FIG. 1, a messaging system 1000 is shown. System 1000 comprises commercial computing device 1040 operated by a commercial user 1130, intermediary computing device 1070 operated by an intermediary user 1132, and a recipient computing device 1100 operated by a message recipient 1134.

In one scenario, the commercial user may be an employer company wishing to sell products to potential customers, the intermediary user may be an employee sales/marketing agent (e.g. an "employee agent") of the employer company, or indeed any interested employee, and the message recipient may be a prospective customer, such as a friend or acquaintance of the employee, that receives messages from the employee agent regarding the products sold by the company.

In another embodiment, the intermediary user may be a non-employee, such as an independent contractor, a designer, or a celebrity. While the description below refers to an intermediary user as an "employee agent" in many instances, it should be understood that an intermediary user may equally be a non-employee (e.g. an independent contractor, a designer, or a celebrity). Moreover, any reference to an "employer company" may be understood to mean any appropriate commercial user vis-à-vis the intermediary user.

The messaging system 1000 may simultaneously support multiple commercial user companies, multiple employee agents within each such company, and multiple prospective customers.

When the employee agents of a commercial user send product messages to potential customers or message recipients, the system 1000 may allow the commercial user to retrieve information regarding these sent messages, particularly, details regarding the messages sent by a particular employee agent and/or details regarding the messages sent having information about a particular product of the company. The system 1000 may even allow the commercial user to obtain information regarding specific interactions of message recipients with the product messages received by those recipients (e.g. "click-through" purchase of a product detailed in the message).

System 1000 comprises network accessible server 1002. Server 1002 comprises processor 1004 and memory 1006. Memory 1006 has stored thereon computer-readable instructions which, when executed by processor 1004, may provide statistical tracking utility 1008, authentication module 1010, commercial communication module 1012, intermediary communication module 1014, message sending module 1016, message tracking module 1017, and message processing module 1018.

Commercial communication module 1012 may be operable to configure server 1002 to transmit communications from server 1002 to commercial computing device 1040, and to receive communications at server 1002 from commercial computing device 1040.

Intermediary communication module 1014 may be operable to configure server 1002 to transmit communications from server 1002 to intermediary computing device 1070, and to receive communications at server 1002 from intermediary computing device 1070.

Message sending module 1016 may be operable to configure server 1002 to transmit communications from server 1002 to recipient computing device 1100. As discussed later, the intermediary may specify recipient electronic contact information that can allow server 1002 to send a product message to the appropriate recipient computing device 1100.

Communications may comprise computer executable instructions, product information, intermediary user information, authorization of intermediary users, images, annotated images, videos, messages, sounds, or any other information that can be communicated over network 1030.

Product messages may comprise textual content, photographs, images, videos, editorials (previously published content), sounds, or any combination thereof.

The message tracking module 1017 may be operable by the commercial user 1130 to provide tracking information to the commercial user, regarding a plurality of product messages that are sent to a plurality of message recipients.

Message processing module 1018 may in response to an interaction between an interested recipient in the plurality of message recipients and a corresponding product message in the plurality of product messages ascertain related useful information.

In some aspect, while the message tracking module 1017 ascertains information related to the sending of product messages, the message processing module ascertains information based on an actual interaction of a product message with an interested recipient. In some embodiments, the scope of these two modules (as with other modules in the system 1000) may overlap, and may logically be a single module.

The statistical tracking utility 1008 may determine useful statistics based on the data collected by the message tracking module 1017, message processing module 1018, and other modules in server 1002.

The authentication module 1010 may be responsible for authenticating a commercial user 1130, intermediary user 1132, and/or a message recipient 1134 with server 1002.

It should be understood that any steps that are specified to be carried out by the server 1002, statistical tracking utility 1008, authentication module 1010, commercial communication module 1012, intermediary communication module 1014, message sending module 1016, message tracking module 1017, and message processing module 1018, may be understood to be steps carried out by the processor 1004.

Databases

Server 1002 also comprises or is linked to a data storage module 1020. The data storage module 1020 may comprise product record database 1022, commercial user database 1024, intermediary user database 1026, message recipient database 1028, and/or other databases. It will be appreciated that the data storage module 1020 may comprise any data structure that provides the functionality described herein. It will further be appreciated that data storage module 1020 may be one or more remote databases, which server 1002 can access through network 1030.

It will also be appreciated that any one or more databases or other data storage modules having non-transitory memory providing the functionality described above may be used in place of data storage module 1020. It should also be noted that such a data storage module does not simply recite a means of achieving a function, but also recites structure at least in the form of non-transitory memory.

Figure 2:
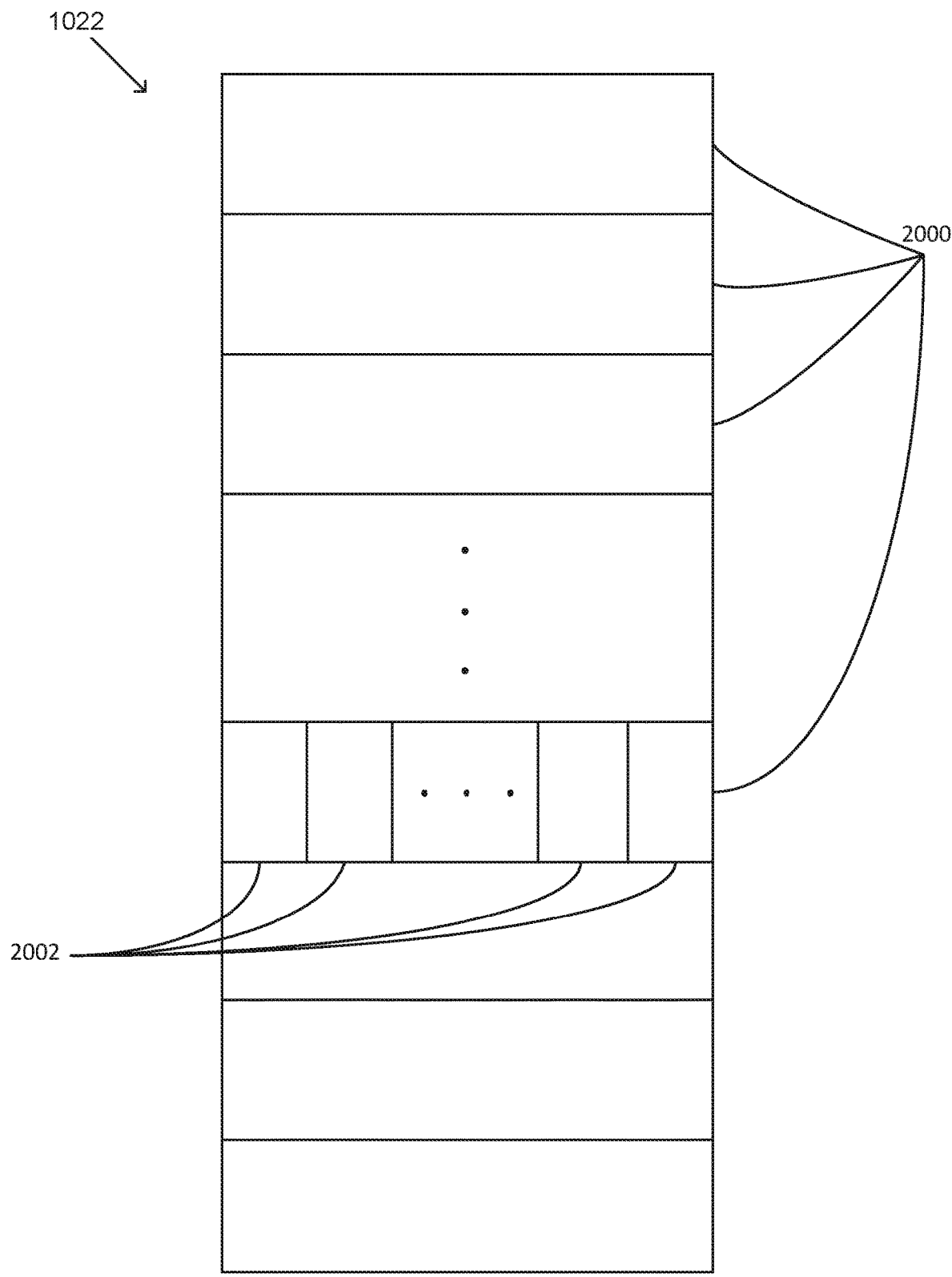
FIG. 2 is a graphical representation of a product record.

Referring to FIG. 2, product record database 1022 may comprise a plurality of product records 2000, one or more of which may comprise a plurality of product fields 2002 for storing information associated with a product. For example, a particular product record may relate to Kellogg's Frosted Flakes®. In this record, there may be a plurality of separate product fields that store information related to the price, shipping weight, nutrition information, and marketing information (e.g. the slogan of "They're Gr-r-reat!").

Figure 3:
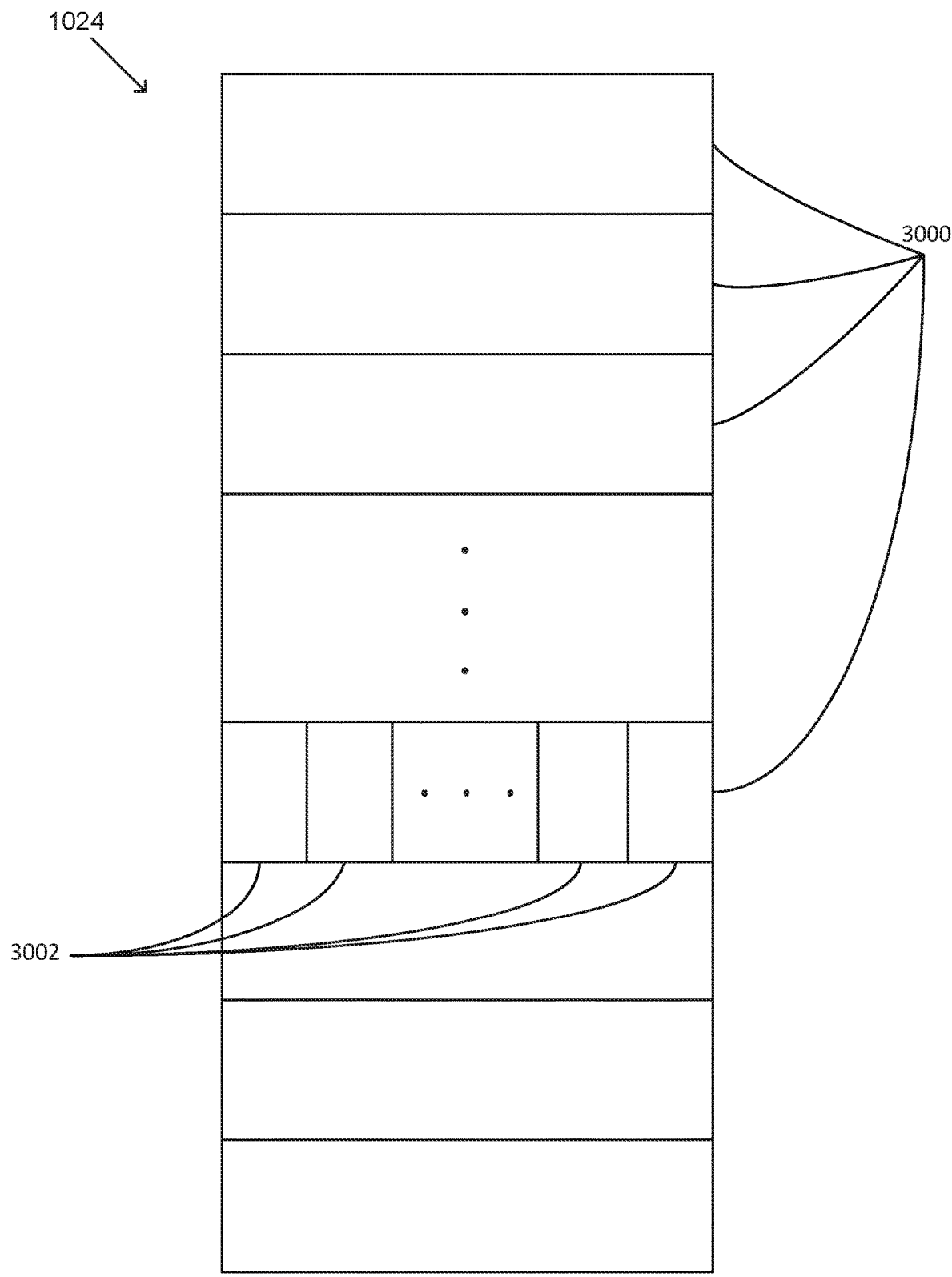
FIG. 3 is a graphical representation of a commercial user record.

Referring to FIG. 3, commercial user database 1024 may be configured to store information about commercial users. In one aspect, commercial user database 1024 may comprise a plurality of commercial user records 3000, one or more of which may comprise a plurality of commercial user fields 3002 for storing information associated with a particular commercial user.

Figure 4:
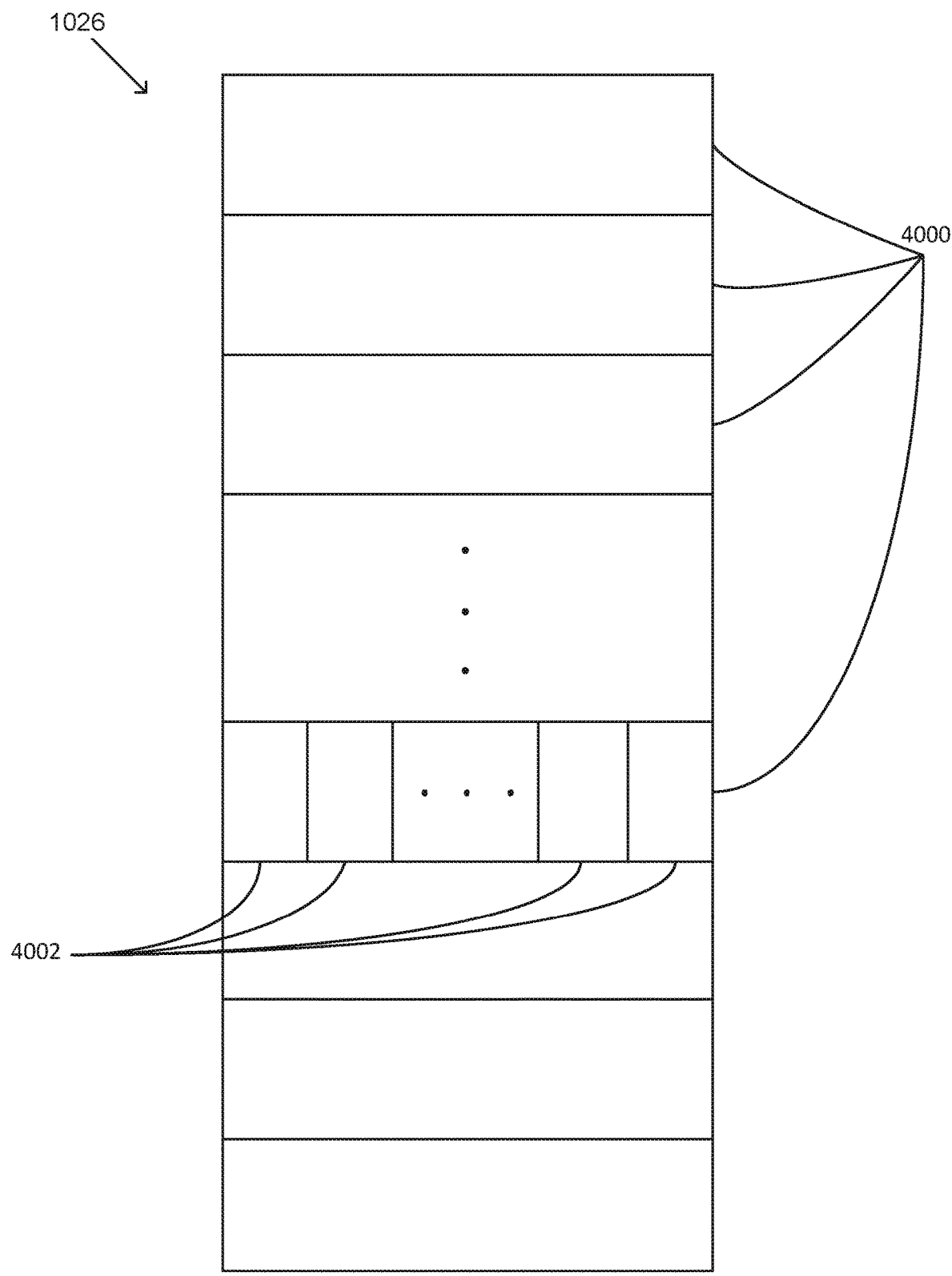
FIG. 4 is a graphical representation of an intermediary user record.

Referring to FIG. 4, intermediary user database 1026 may be configured to store information about intermediary users. In one aspect, intermediary user database 1026 may comprise a plurality of intermediary user records 4000, one or more of which may comprise a plurality of intermediary user fields 4002 for storing information associated with a particular intermediary user.

Figure 5:
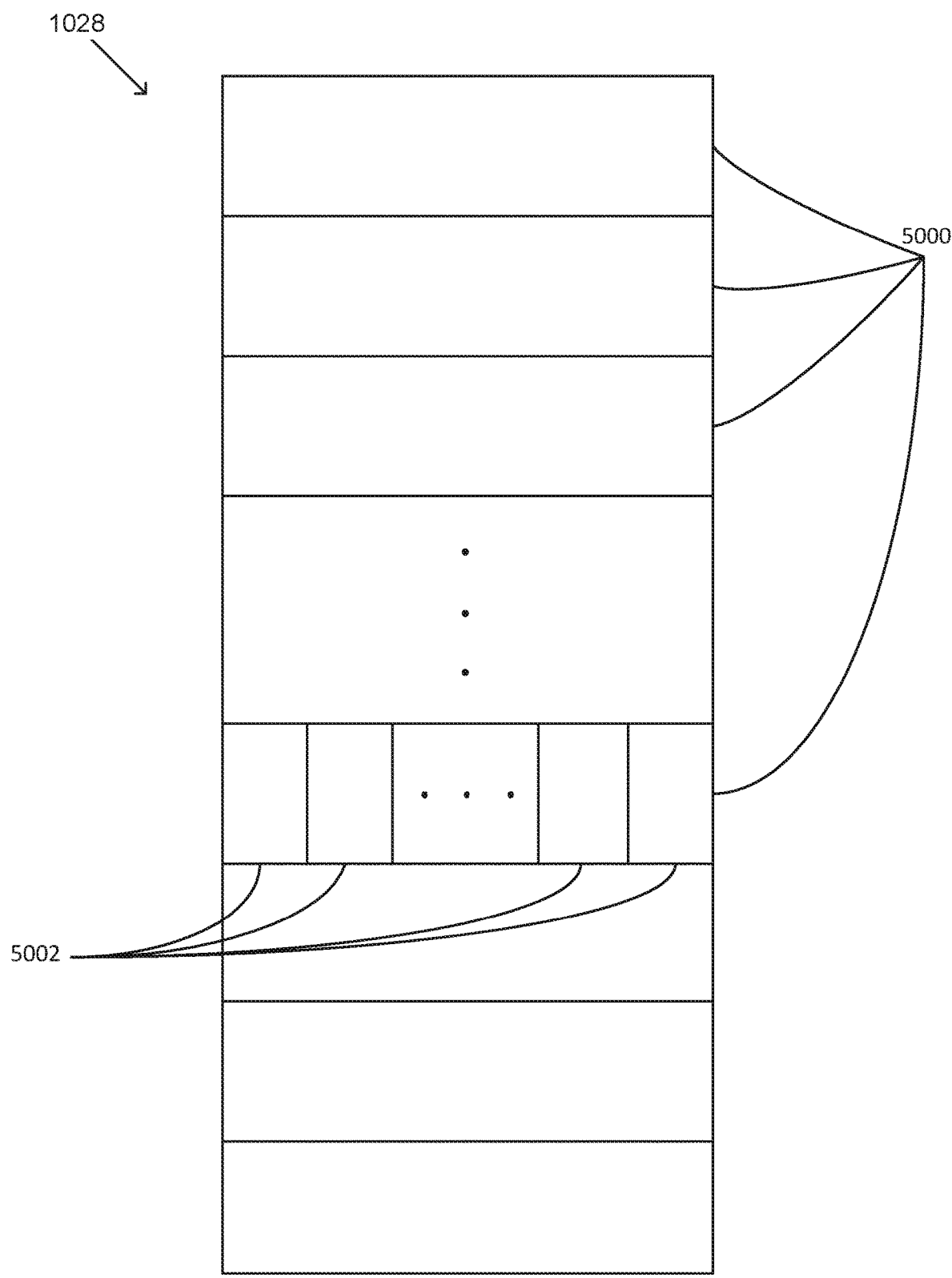
FIG. 5 is a graphical representation of a message recipient record.

Referring to FIG. 5, message recipient database 1028 may be configured to store information associated with message recipients. In one aspect, message recipient database 1028 may comprise a plurality of message recipient records 5000, one or more of which may comprise a plurality of message recipient fields 5002 for storing information associated with a particular message recipient.

Any one of the databases discussed above, may be preloaded with a plurality of records.

Computing Devices

Referring back to FIG. 1, system 1000 may comprise a commercial computing device 1040 that is operable to access the server 1002 via the commercial communication module 1012 through network 1030. The commercial computing device 1040 preferably includes a network module 1042, including one or more of a cellular transceiver communicable with a cellular network that is linked to the network 1030 (for example, using GPRS, WiMAX, a 3G protocol, a 4G protocol, etc.), Wi-Fi transceiver communicable with a Wi-Fi gateway linked to the network 1030, Bluetooth transceiver communicable with a Bluetooth gateway linked to the network 1030, or another transceiver, operable to enable the commercial computing device 1040 to connect to the network 1030.

The commercial computing device 1040 preferably comprise processor 1044 that is operable to execute computer instructions, and memory 1046 having computer instructions stored thereon that can be executed by processor 1044.

The commercial computing device 1040 additionally comprises an input device 1048. The input device 1048 may comprise a keyboard, mouse, trackpad, trackball, scroll wheel, remote control, touch-screen display, or other input device for obtaining input from commercial user 1130. The input device 1048 could further include a microphone and a voice recognition module operable to obtain input via a user's voice.

The commercial computing device 1040 may further comprise an output device, such as a commercial display 1049, to output information to the commercial user 1130.

In one aspect, input device 1048 and commercial display 1049 may be a single device such as a touch-screen display, enabling both input and output. In this regard, the use of the term "click" in the following description would include touching one or more particular points on the display. Further, the touch-screen display may be adapted for providing a virtual keyboard for obtaining input from a user.

The commercial computing device 1040 may further comprise a camera 1050 enabling a user of the commercial computing device 1040 to capture images and/or video using the commercial computing device 1040.

The mobile device may further comprise a location module 1052, such as a GPS module, operable to obtain location data from an external source. The location data may comprise latitude, longitude, elevation, etc.

When the processor 1044 executes computer instructions, for example computer instructions stored on memory 1046, one or more computer applications, such as an operating system 1054, a web browser 1056, one or more user applications 1058 (e.g., "apps" as they may be known), a commercial user interaction utility 1060, may be provided. In this regard, the term "utility" includes a "module" or other hardware component operable to perform the functionality described herein. Furthermore, more than one of the utilities may be provided in any one such hardware component or, similarly, the various utilities could be provided on a distributed basis in a plurality of hardware components.

The commercial user interaction utility 1060 may provide a user interface for the commercial user 1130 in relation to the communications between server 1002 and commercial computing device 1040.

It will be appreciated that commercial computing device 1040 executes the operating system 1054 and that the operating system provides a means for launching other computer applications, including but not limited to those specified above.

System 1000 may further comprise an intermediary computing device 1070 that is operable to access the server 1002 via intermediary communication module 1014 through network 1030. The intermediary computing device 1070 includes a network module 1072, processor 1074, and memory 1076 that may be substantially similar in functionality to the network module 1042, processor 1044, and memory 1046, respectively, as described previously. The intermediary computing device 1070 may further include an input device 1078, intermediary display 1079, camera 1080, and location module 1082 that may be substantially similar in functionality to the input device 1048, commercial display 1049, camera 1050, and location module 1052, respectively, as described previously.

When the processor 1074 executes computer instructions, for example computer instructions stored on memory 1076, one or more computer applications, such as an operating system 1084, a web browser 1086, one or more user applications 1088 may be provided that may be substantially similar in functionality to the operating system 1054, web browser 1056, one or more user applications 1058, respectively, as described previously.

Additionally, when the processor 1074 executes computer instructions, an intermediary user interaction utility 1090 may also be provided. The intermediary user interaction utility 1090 may provide a user interface for the intermediary user in relation to the communications between server 1002 and intermediary computing device 1070.

System 1000 may further comprise a recipient computing device 1100 that is operable to receive messages from server 1002 via message sending module 1016 through network 1030. The recipient computing device 1100 includes a network module 1102, processor 1104, and memory 1106 that may be substantially similar in functionality to the network module 1042, processor 1044, and memory 1046, respectively, as described previously. The recipient computing device 1100 may further include an input device 1108, recipient display 1109, camera 1110, and location module 1112 that may be substantially similar in functionality to the input device 1048, commercial display 1049, camera 1050, and location module 1052, respectively, as described previously.

When the processor 1104 executes computer instructions, for example computer instructions stored on memory 1106, one or more computer applications, such as an operating system 1114, a web browser 1116, one or more user applications 1118 may be provided that may be substantially similar in functionality to the operating system 1054, web browser 1056, one or more user applications 1058, respectively, as described previously.

Additionally, when the processor 1104 executes computer instructions, a recipient interaction utility 1120 may also be provided. The recipient interaction utility 1120 may provide a user interface for the recipient user in order to interact with the communications between server 1002 and recipient computing device 1100.

Messaging and Audit Functionality

In embodiments of the invention in which the intermediary users are employee agents, and in relation to the messaging functionality, one aspect of the invention is to allow employee agents of a company (intermediary users) to make decisions regarding sending product information to potential customers (recipients), and allowing the employer company (commercial user) to evaluate the performance of these employee agents with respect to the messages sent by each such employee agent to potential customers. In a broad sense, each of these employee agents may be an "individual curator" of one or more sets of products (product containers) of the employer company and may have a high degree of freedom in marketing/selling the associated products to potential customers. This individual freedom exercised by each employee agent gives the employer company (commercial user) the kind of "distributed intelligence" resulting from its ability to make use of the individual knowledge and contacts of its perhaps extensive list of employees, to sell its products using system 1000. At the same time, the system 1000 may allow the employer company to monitor the performance of each such employee agent, and also to exercise some measure of control over how these individual employees send messages, or what kinds of content they can include in this messages.

The employer company may also choose to ascertain useful information regarding the marketing of a particular product by all employee agents as a collective, for example, by monitoring all product messages sent by any employee agent containing information about that product.

In determining information about the product messages sent, it may also be beneficial for the commercial user to obtain information regarding the interactions of the recipients with these messages. This aspect, which involves analysis of interactions between the potential customers and the messages sent to these customers, will be discussed below.

To illustrate the above discussion, a commercial user may be a fashion house that manufactures men's clothes, women's clothes, and accessories. Different employee agents may be granted different levels of access and permission to market/sell different products and product lines of the fashion house. After an initial period, the fashion house may desire to evaluate its current crop of employee agents to evaluate their individual effectiveness. Based on this data, the fashion house may desire to re-allocate the products between the employee agents and/or choose to retain only some of the employee agents in its workforce.

The first step in this process may be for the fashion house/commercial user to associate its products with one or more "product containers" defined within the system. For example, the fashion house may create a men's clothes container ($PC_{men}$), a men's luxury clothes container ($PC_{men\ luxury}$), a women's clothes container ($PC_{women}$), and an accessories container ($PC_{accessories}$), for storing information about its lines of men's clothes, high-end men's clothes, women's clothes, and accessories, respectively. Moreover, to each of these containers, the fashion house may associate one or more employee agents/intermediary users (e.g. "Bob Smith" and "Anna Roberts") with access to the information in the respective container. The internal designator to refer to the above containers, products, and intermediary users, may be different from the identifiers listed above. For example, Container$_{men\ luxury}$ may be internally designated as "PC5" (for product container #5), and "Bob Smith" may have an internal designator of "IU674".

It should be understood that in some embodiments, the intermediary users are employee agents that are employed by the commercial user. However, this may not be the case in all embodiments, and the intermediary user may be entities that are external to the commercial user, such as third-party marketing experts, members including employees of related business entities (i.e. retailers who sell product from the commercial user) or indeed any external entity that may want to send this kind of content to its contacts, if the commercial user is willing to allow them to do so.

Figure 6:
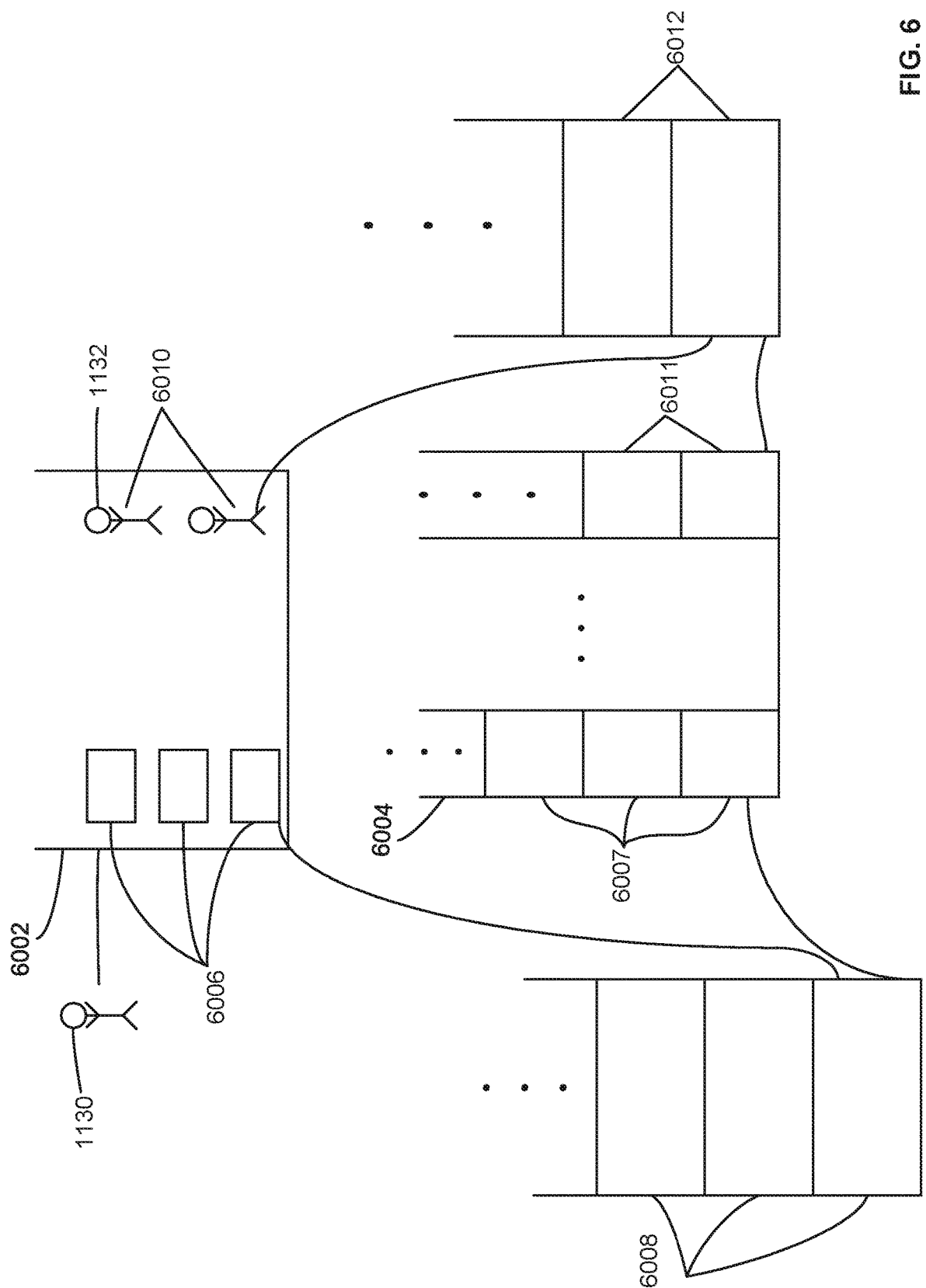
FIG. 6 is a graphical representation of a product container and related entities.

More formally, referring to FIG. 6, the server 1002 may be configurable to allow commercial user 1130 to specify product container 6002, and associate plurality of products 6006 and plurality of intermediary users 6010 with the product container 6002. The plurality of intermediary users 6010 may include intermediary user 1132 (e.g. the employee agent "Bob Smith") shown in FIG. 1.

The product container 6002 may have a corresponding product container record 6004 stored on the data storage module 1020, for storing information about the product container 6002.

The process of the commercial user associating the plurality of products 6006 with the product container 6002 may require storing a plurality of product designators 6007 that designates a corresponding plurality of product records 6008 in the product container record 6004, wherein for each product in the plurality of products 6006, a corresponding product record in the plurality of product records 6008 stores information regarding that product.

For example, the commercial user may store a number of different suit products in the high-end men's clothes container. Each such product may have a product record in the data storage module 1020, and each such product record may have a corresponding product designator that is stored in the container record for $PC_{men\ luxury}$. Such a product designator may be, for example, the Stock Keeping Unit (SKU) number SKU76006 or a memory address of the product record.

The process of the commercial user associating the plurality of intermediary users 6010 with the product container 6002 may require storing a plurality of intermediary user designators 6011 that identifies a corresponding plurality of intermediary user records 6012 in the product container record 6004, wherein for each intermediary user in the plurality of intermediary users 6010, a corresponding intermediary user record in the plurality of intermediary user records 6012 stores information regarding that intermediary user.

For example, the commercial user may associate a number of different employee agents/intermediary users with the high-end men's clothes container. Each intermediary user may have an intermediary user record in the data storage module 1020, and each such intermediary user record may have a corresponding intermediary user designator that is stored in the container record for $PC_{men\ luxury}$. Such an intermediary user designator may be, for example, IU674, which may refer to employee agent "Bob Smith". Alternatively, the intermediary user designator may simply be "Bob Smith" itself or a memory address of the intermediary user record.

The intermediary user record may have information such as the full name of the intermediary user, start date of the association of the intermediary user with the commercial user, list of product containers the intermediary user is associated with, and address information.

In some embodiments, an intermediary user as discussed above may not be an internal employee. For example, if the fashion house discussed above is highly skilled at making products and adapting to the market needs, but do not have the internal expertise to sell its merchandize, it may hire "external agents" (also intermediary users) to market and sell the merchandize.

The intermediary user record may include a relationship field to indicate the type of association between the employer company and the intermediary user. For example, if the intermediary user is an employee agent, the relationship field may be set to EMPLOYEE_AGENT for that intermediary user. On the other hand, if the intermediary user is an "external agent", the relationship field may be set to EXTERNAL_AGENT. Depending on the category of the intermediary user (e.g. employee agent or external agent), the intermediary user record may contain further information that is specific to that category of intermediary users, in the form of extended intermediary user information. For example, if the intermediary user is an employee agent, the extended intermediary user information in the intermediary user record may specify the internal department of the employee agent within the employer company. On the other hand, if the intermediary user is an external agent, the extended intermediary user information may include the registered address information for that intermediary user. Such address information may be unnecessary for an employee agent, since the registered address information for an employee agent may just be the address of the employer company.

A commercial user may create a new product container and associate products and intermediary users with the product container via a user interface.

Figure 7:
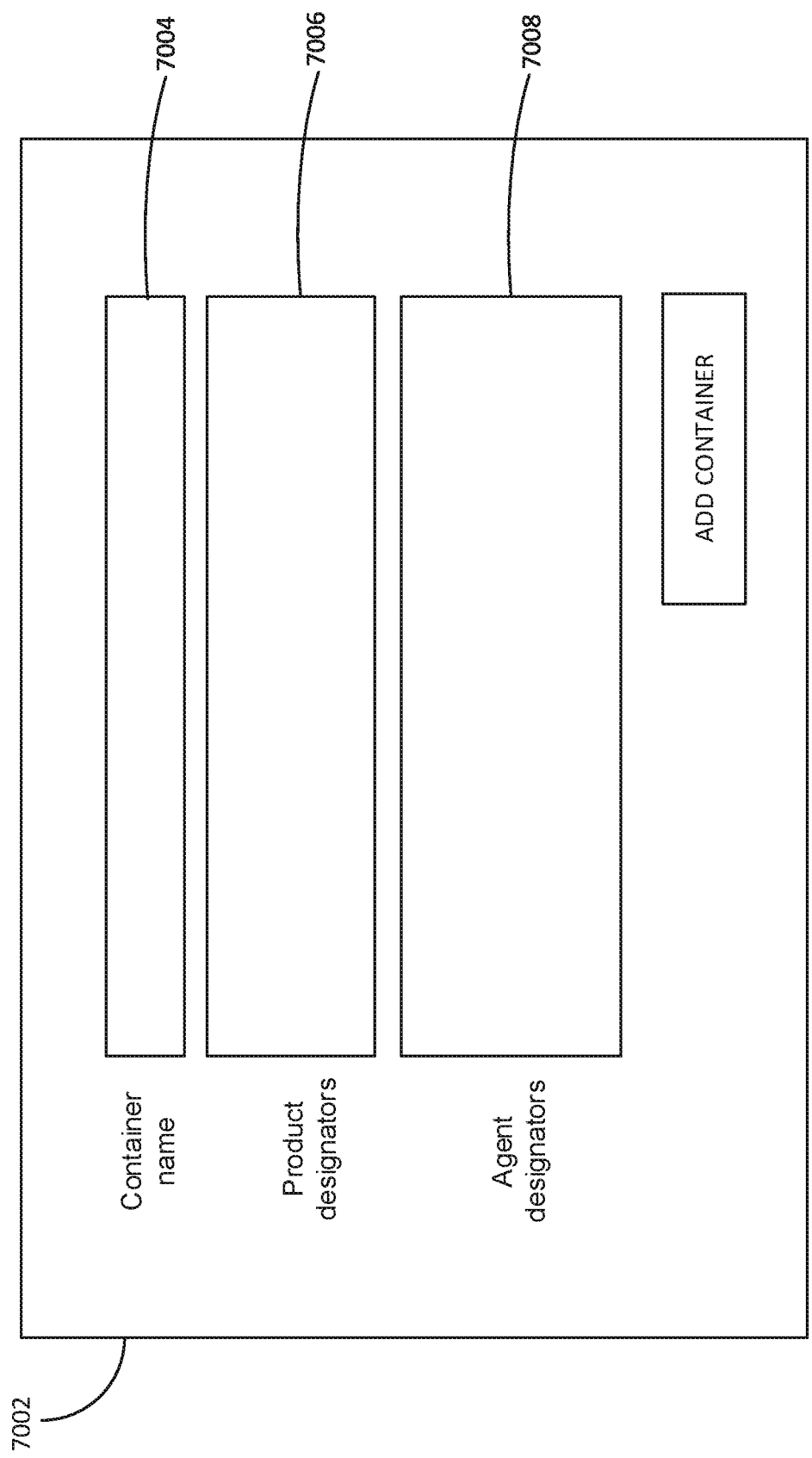
FIG. 7 is a graphical representation of a display provided to enter container information.

In one embodiment, the commercial user may create a container via the commercial user interaction utility 1060 of the commercial computing device 1040. Referring to FIG. 7, a container page 7002 may allow the commercial user to specify attributes such as the container name 7004 of product container 6002, designators of products 7006 associated with the product container 6002, and designators of authorized intermediary users (e.g. designators of employee agents "Bob Smith" and "Anna Roberts") 7008 of the product container 6002. In specifying a new product to be associated with the product container 6002, the commercial user may simply specify a product designator or any other reference to the product record that stores information about the product. In specifying a new intermediary user to be associated with the container, the commercial user may simply specify an intermediary user designator or any reference to the intermediary user record that stores information about that intermediary user.

For example, the container name 7004 may be "Luxury Men's clothes" ($PC_{men\ luxury}$) and the commercial user/ fashion house may enter identifying information about various products and/or categories of products into the designators of products 7006 field. For example, the commercial user may enter the SKU numbers SKU76006, SKU30233, and SKU23327 into this field to indicate that the products having these SKU numbers should be associated with the product container $PC_{men\ luxury}$. Moreover, the commercial user may enter intermediary user designators into field 7008 to identify intermediary users that he wants to authorize vis-à-vis the container. Such designators may be any identifier that can uniquely identify an intermediary user, and may be the name of the intermediary user ("Bob Smith") and/or any other identifier (e.g. "IU674").

With this information, the server 1002 may create a new product container record 6004 for this product container, and may designate the product container by an appropriate designator (e.g. PC5).

When associating a new product with a container, a product record that stores information about the new product may already exist in the data storage module 1020. If such a record does not exist, the commercial user may create a new product record for that product to store the necessary information.

Figure 8:
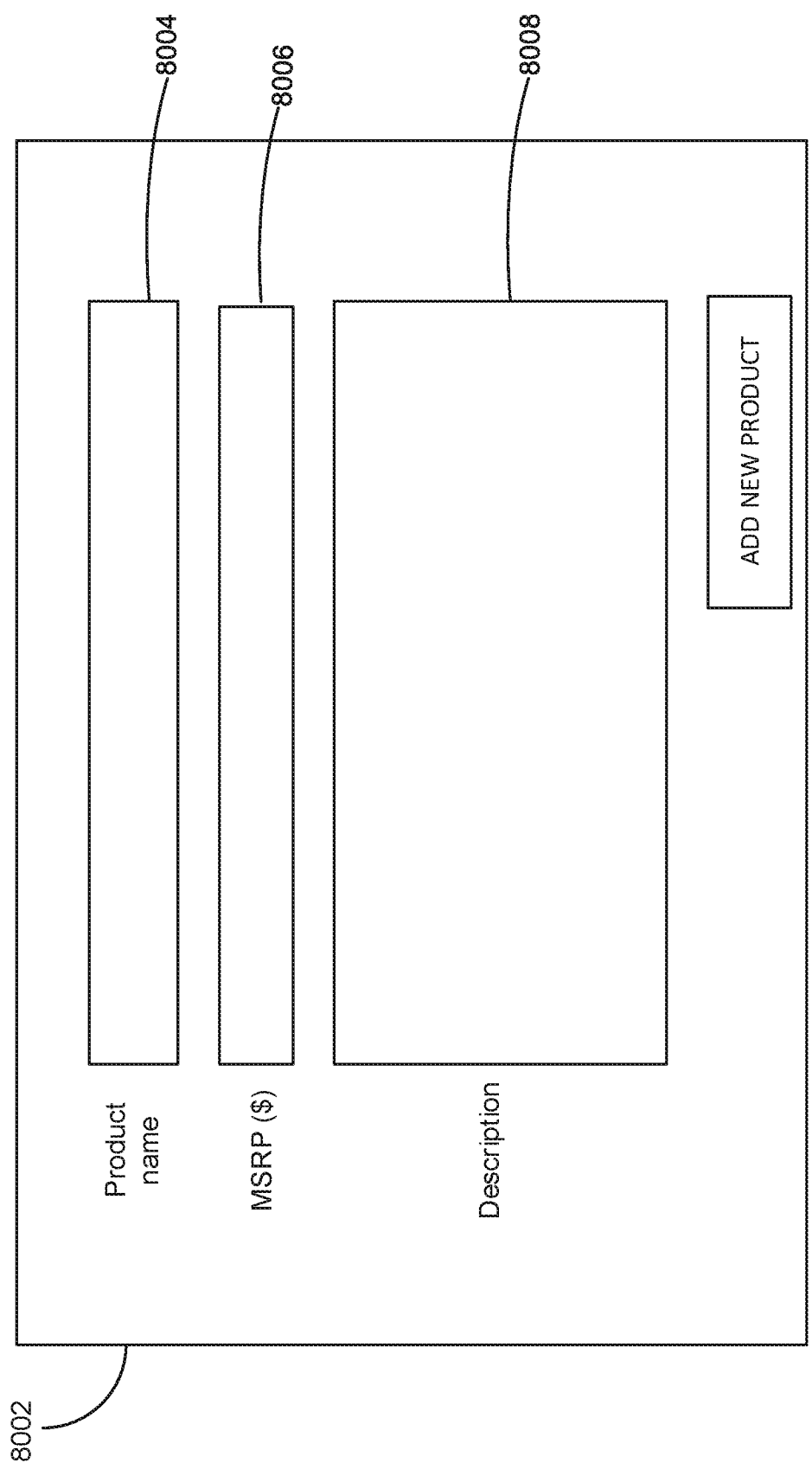
FIG. 8 is a graphical representation of a display provided to enter product information.

Referring to FIG. 8, an add product control window 8002 may allow the commercial user 1130 to modify the plurality of product records by creating a new product record in the data storage module 1020 by specifying various attributes of the corresponding new product in the add product control window 8002. The add product control window 8002 may be displayed on the commercial display 1049 at the initiation of the commercial user interaction utility 1060. The specified attributes may include product name 8004, product MSRP 8006, and product description 8008. When a new product record is created in this fashion in the data storage module 1020, the server 1002 may automatically assign a unique product designator for the newly created product record. Alternatively, the commercial user may specify a unique designator himself.

For example, the fashion house/commercial user may have created new line of men's suits. In this case, the commercial user may enter "Regal" as the product name 8004 and $2,000 as the MSRP 8006. The commercial user may enter a textual description in product description 8008, or product description 8008 may comprise many subfields, such as the available sizes for the suit, the available colors, availability date, etc. Product description 8008 may even allow the commercial user to specify "package deals" with respect to other products in the product container. When the commercial user adds this new product, the server 1002 may create a new product designator for this new product (e.g. SKU40323).

Figure 9:
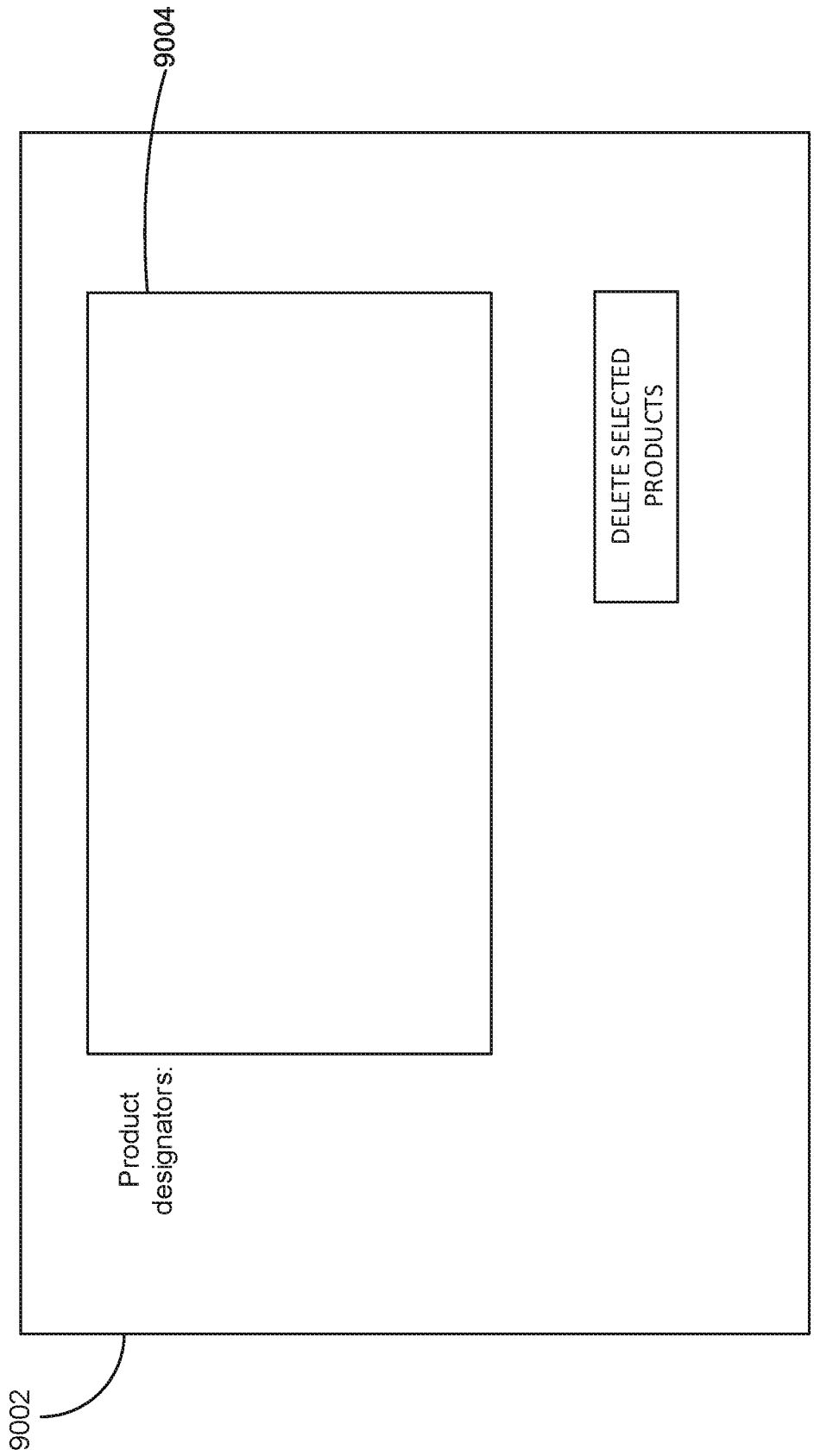
FIG. 9 is a graphical representation of a display provided to remove product information.

Referring to FIG. 9, a product delete control window 9002 may allow the commercial user 1130 to modify the plurality of product records by deleting an existing product record in the data storage module 1020. The product delete control window 9002 may display one or more product designators 9004, where each such product designator designates a corresponding product record in the plurality of product records 6008.

For example, the fashion house may have decided to retire the "Fitzgerald" line of its suits. This product may currently be designated as SKU40311 in the server 1002. To delete this product from the server 1002, the commercial user may specify the product designator SKU40311 through the product delete control window 9002. The product designator may be displayed in product delete control window 9002 as an icon having the text SKU40311, an icon with the name "Fitzgerald", or by any other suitable means that uniquely identifies the product record storing information about the corresponding product. Alternatively, the commercial user may simply enter the product designator into a text field in the product delete control window 9002.

When the commercial user 1130 interacts with one of these product designators via the product delete control window 9002, the server 1002 may receive details of the interaction through commercial communication module 1012 and may delete the corresponding product record from the plurality of product records.

It should be noted that as with product delete control window 9002, any window in system 1000, including other product and intermediary user related windows, may display a particular designator as a text representation of the designator, a graphical representation (e.g. icon) of the designator, a voice representation of the designator, and/or any other suitable proxy for the designator. In this sense, a reference to a designator may equally be considered to refer to the external representation of the designator (e.g. as viewed by a commercial user), as it is to refer to the server's internal notion of the designator.

A preferred embodiment of system 1000 may allow the commercial user to associate and/or disassociate a product vis-à-vis the container record 6004 subsequent to the creation of the container record 6004.

Figure 10:
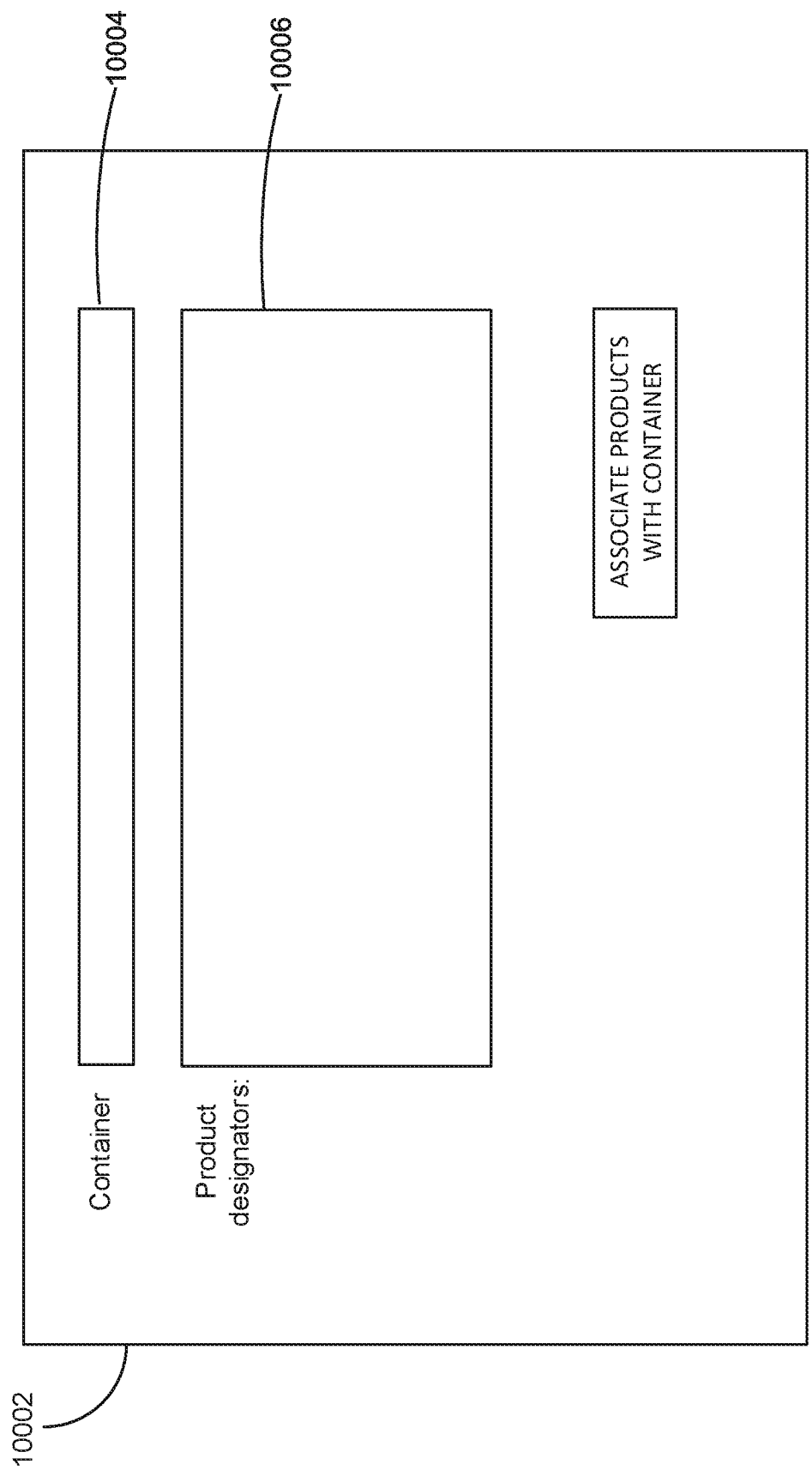
FIG. 10 is a graphical representation of a display provided to associate product(s) with a container.

Referring to FIG. 10, an associate product control window 10002 is shown that allows a commercial user to specify product designators 10006 to associate with container record 6004, referenced by container designator 10004. A similar screen may allow a commercial user to disassociate a product vis-à-vis the container record 6004.

For example, as discussed earlier, the commercial user may have created a new product record corresponding to the new "Regal" line of suits. However, this product has not yet been associated with any product containers. Using the interface provided in associate product control window 10002, the commercial user may be able to associate this product with high-end men's clothes container. Specifically, the commercial user may specify container designator "PC5" in container designator field 10004 and may specify "SKU40323" in product designators 10006.

A preferred embodiment of system 1000 may allow a commercial user to authorize an intermediary user or revoke the authorization of an intermediary user vis-à-vis the container record 6004 subsequent to the creation of container record 6004, which stores information about product container 6002.

For example, the commercial user may determine that a particular employee agent (intermediary user) is not very effective in marketing women's clothes, and may determine that a different employee agent is more effective at this task. To optimize the capabilities of the commercial user's workforce and to deploy its "distributed intelligence" most effectively, the commercial user may revoke the authorization of the former employee agent vis-à-vis the container record 6004, and authorize the latter employee agent to have access vis-à-vis the container record 6004.

Figure 11:
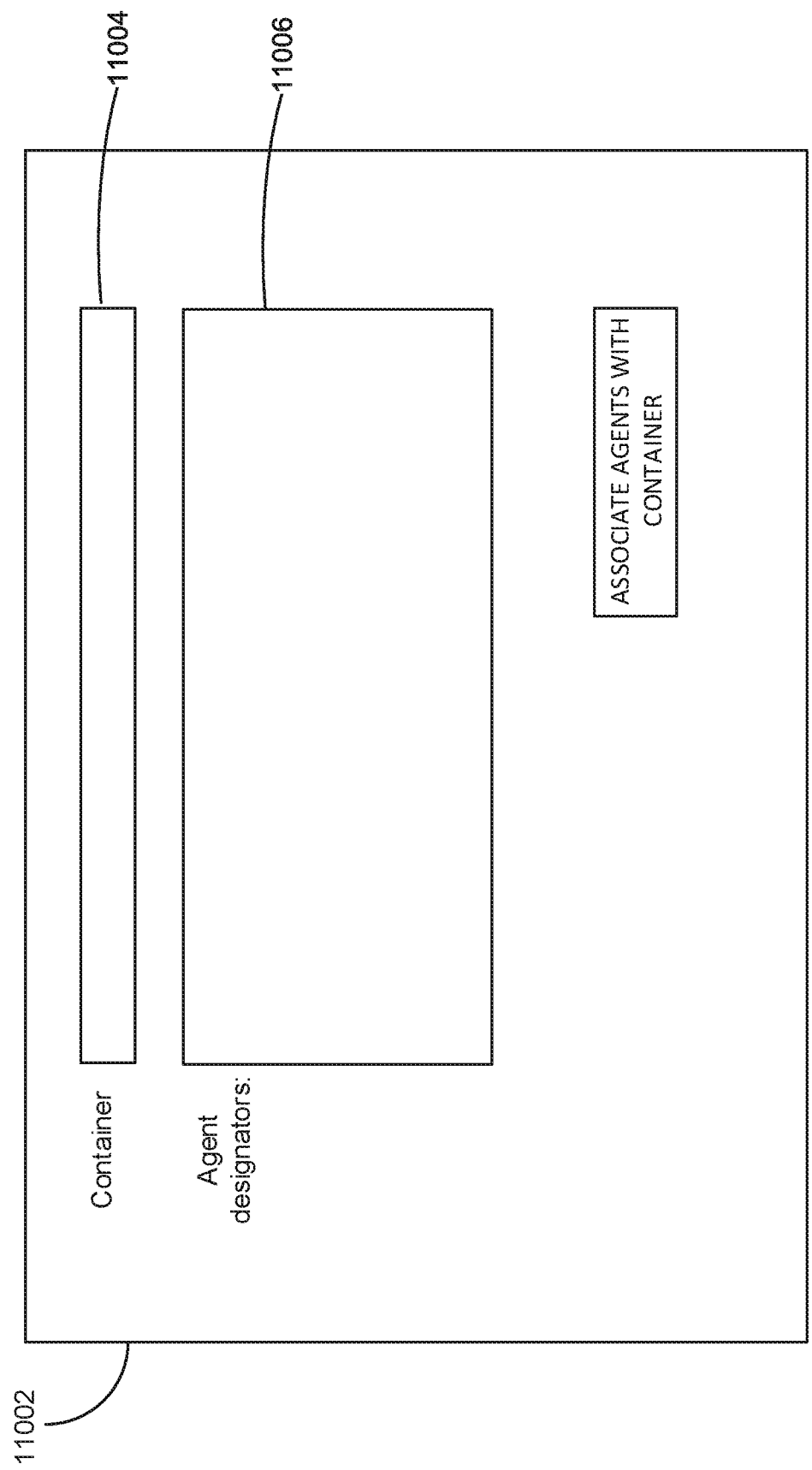
FIG. 11 is a graphical representation of a display provided to associate intermediary user(s) with a container.

Referring to FIG. 11, an associate intermediary user control window 11002 may allow a commercial user to specify intermediary user designators 11006 to associate with container record 6004, where the container record 6004 is designated by container designator 11004. Upon the commercial user interacting with the "associate" button on the associate intermediary user control window 11002, the intermediary user records associated with the intermediary user designators 11006 may be added to the plurality of intermediary user records associated with the product container. If the commercial user interacts with a corresponding "revoke" button on a similar page, the intermediary user records associated with the intermediary user designators 11006 may be removed from the plurality of intermediary user records associated with the product container.

For example, the fashion house/commercial user may wish to add the employee agent "Anna Roberts" to the high-end men's clothes container as an intermediary user, given her high performance in selling high-end men's accessories (e.g. watches) in the past. In intermediary user control window 11002, the commercial user may enter container designator "PC5" in container designator field 10004 and may specify "IU709" (corresponding to "Anna Roberts") in the intermediary user designators field 11006.

An authorization as discussed above may also be initiated by an intermediary user itself. For example, a particular intermediary user 1132, utilizing intermediary user interaction utility 1090, may request a commercial user 1130 to authorize intermediary user 1132 to be given access product container 6002, which is "owned" by commercial user 1130. Upon receiving such a request, commercial user 1130 may authorize or deny the requested access to intermediary user 1132.

For example, employee agent "Anna Roberts" may feel that she can make a significant contribution to the sale of high-end men's clothes manufactured by the company, which may have a high commission rate for successful sales. The system 1000 may have a mechanism where she can request access to the high-end men's clothes container from the container manager of that product container. When Anna sends that request to the container manager, the container manager may review Anna's sale performance vis-à-vis other product containers and/or her general sale performance within the company, including sales occurring outside the system 1000, and then decide whether or not to grant her the access she desires.

Some commercial users/employers may perform a substantial review of an employee agent who wishes to become an intermediary user 1132 of the system 1000 and wishes to be associated with a particular product container 6002. Given that it may not be desirable for an end customer to receive multiple messages about the same product, the employer may wish to limit access to certain products and/or product containers to very specific employees. For example, a commercial user wishing to maintain a high-level of product "prestige" vis-à-vis a product may wish to grant access to that product and/or the product container having that product to only very specific employee agents, and only after these employee agents have gone through a rigorous screening process.

In another embodiment, when intermediary user 1132 requests access from commercial user 1130, she may not specify a particular product container. Based on the information provided by intermediary user 1132 in the request, commercial user 1130 may deny the request, or may select an appropriate product container 6002 and grant access to intermediary user 1132 to access product container 6002 and/or one or more products in product container 6002.

When commercial user 1130 grants access to intermediary user 1132 to access product container 6002, an intermediary user designator that uniquely identifies the intermediary user record storing information about the intermediary user 1132 may be stored in product container record 6004 that stores information about product container 6002.

A server 1002, configured as described above, may ensure that only the plurality of intermediary users 6010 associated with the product container 6002 may access information about the plurality of products 6006 associated with product container 6002. With this limitation, the commercial user 1130 may ensure that only authorized persons (e.g. plurality of intermediary users 6010) may access information about the plurality of products 6006 associated with the product container 6002, in order to send messages having this information to recipients.

For example, another employee agent of the fashion house "Michael Johnson" may desire to market and/or sell the products that are associated with the high-end men's clothes container $PC_{men\ luxury}$. However, without explicit authorization from the fashion house/commercial user, "Michael Johnson" may not be able to access information regarding the products associated with this container. One exception to this would be if "Michael Johnson" has access to another container that includes the same products; for example, he may have access to the men's clothes container $PC_{men}$, which may include all the high-end men's clothes of container $PC_{men\ luxury}$.

An important aspect of the system 1000 may be to allow the intermediary users associated with a product container from sending product messages to recipients, where the product messages contain information about the products in the container.

Figure 12:
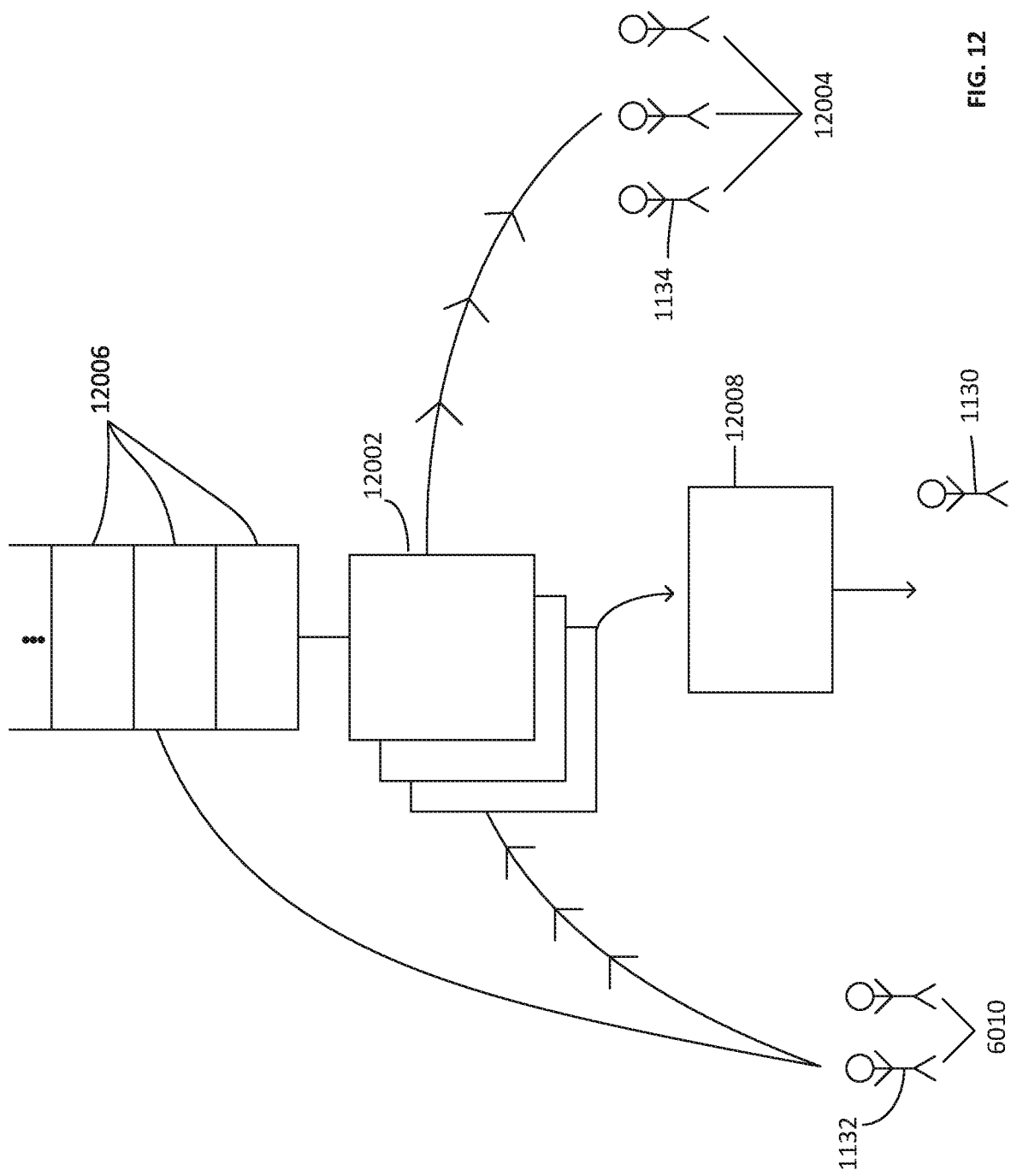
FIG. 12 is a graphical representation of sending product messages.

Referring to FIGS. 1, 6, and 12, in some embodiments, the server 1002 may be configurable to allow a plurality of intermediary users 6010 to send a plurality of product messages 12002 to a plurality of message recipients 12004. The plurality of intermediary users 6010 may include intermediary user 1132 shown in FIG. 1 (e.g. employee agent "Bob Smith"), and plurality of message recipients may include message recipient 1134 shown in FIG. 1. Each product message in the plurality of product messages 12002 may comprise product information that is, at least in part, derived from at least one selected product record 12006 selected by the intermediary user 1132. The plurality of product records 6008 include the at least one selected product record 12006.

Figure 13:
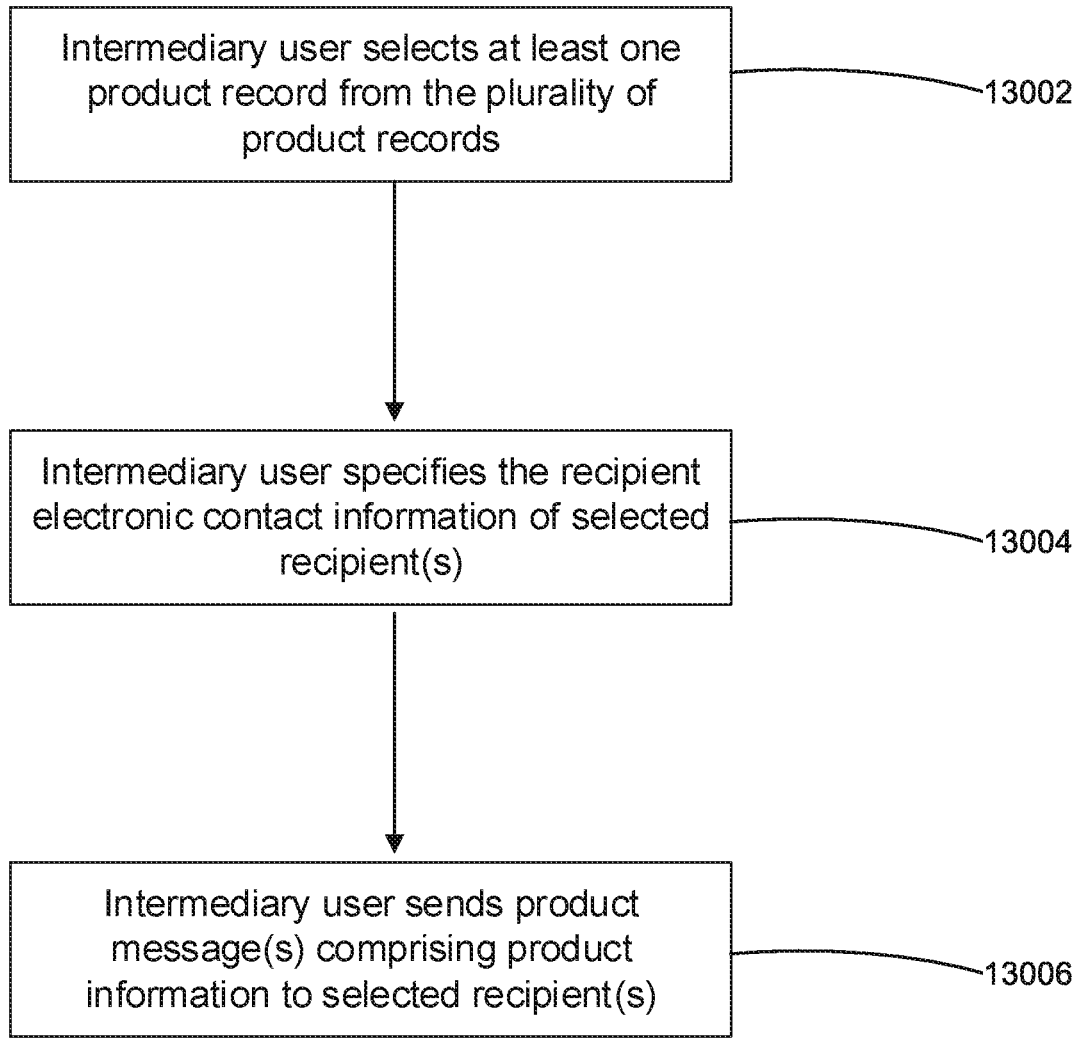
FIG. 13 is a flowchart illustrating sending product messages.

FIG. 13 illustrates, with reference to FIGS. 1, 6, and 12, the steps that may be taken by intermediary user 1132 in the plurality of intermediary users 6010 to send product messages to message recipients, including message recipient 1134.

In step 13002, intermediary user 1132 selects at least one selected product record 12006 from the plurality of product records 6008. In selecting the at least one selected product record 12006, the intermediary user interaction utility 1090 may provide the intermediary user 1132 with capability to search and filter the products in the product container 6002.

For example, employee agent "Anna Roberts" may be associated with the high-end men's clothes container of the fashion house. The fashion house may also have associated all of the company's high-end men's clothes in this container. However, Anna's expertise may be particularly strong with high-end golf attire for men, which is a subset of high-end men's clothes. Moreover, given her experience in markets that are not primary fashion hubs, she may be particularly skillful in the distribution of previous years' designs. The intermediary user interaction utility 1090 may allow her to filter such products from the full set of products in the product container 6002. For example, the available filters may include a field to specify the calendar year in which a product was initially released.

The intermediary user interaction utility 1090 may also allow her to "favourite" such products, so that they are more easily accessible on her future visits to the container and may also allow her to be notified of "related" products to the products that she has manually selected based on the data mining capabilities of statistical tracking utility 1008. For example, based on previous search criteria that she has entered, at the start of each calendar year, the golf attire designs from the previous year (which were the latest designs in the previous calendar year) may be automatically pushed to a dashboard in the intermediary user interaction utility 1090 for her review.

In step 13004, the intermediary user specifies the recipient electronic contact information for the message recipients. Here, the recipient electronic contact information of a message recipient may simply be an internal identifier associated with that message recipient that may indirectly point to direct contact information of the message recipient. For example, the internal identifier of a message recipient may be "Peter Chao", and this identifier may be internally resolved to his direct contact information of 519-888-4567 and/or peterchao@gmail.com. Alternatively, the recipient electronic contact information may simply be the direct contact information (e.g. email, phone/text number) of the message recipient.

The direct contact information of a recipient, which is directly or indirectly obtained through the electronic contact information, may be any unique contact point that may be utilized to communicate with the recipient. As mentioned previously, this may be an email address, phone/SMS number, instant messaging address, Skype™ address, Facebook™ ID, among others. Therefore, a product message may be an email, SMS message, instant message, Skype message, and Facebook message, respectively. As should be apparent to a reader of skill in the art, other types of accounts and platforms may also be suitable for sending messages to the message recipients. For example, the Spread Media communication system described in PCT Application No. WO2013003957A1, and shown at www.loveitspreadit.com, may allow server 1002 to send one or more product messages to a recipient, while ensuring the anonymity of the recipient. In one such embodiment (not necessarily the embodiment shown in www.loveitspreadit.com), an intermediary user may specify a general class of message recipients, and the recipient electronic contact information may refer to the attributes that define this class of message recipients. The server 1002 may then send a product message to each message recipient in this class of message recipients, while the identity of each message recipient is anonymous vis-à-vis the intermediary user.

In some embodiments, the electronic contact information may be pre-defined in an internal "address book" of recipients. This master list of message recipients may be shared between multiple employee agents, and some employee agents may have their own message recipient lists. In either case, the intermediary user interaction utility 1090 may provide filters to an employee agent to filter the contact list to obtain desirable message recipients for the current session. In this case, an employee agent "specifying" the recipient electronic contact information for the message recipients is equivalent to the employee agent "selecting" a subset of recipients from a larger set of recipients, where the contact information for each such selected recipient is already pre-defined in server 1002.

For example, regarding the golf attire designs previously discussed, the employee agent "Anna Roberts" may only be interested in male recipients from Europe that are geographically distant from the fashion capitals in that continent (e.g. London, Paris, Milan). The contact search filters that are made available to Anna through the intermediary user interaction utility 1090 may allow her to isolate these recipients from a larger list of recipients.

The message recipients may also simply be personal contacts of the intermediary user. For example, as previously mentioned, the direct contact information of a message recipient may be a Facebook™ ID. In some embodiments, for an intermediary user to send a message to a message recipient, the intermediary user and the message recipient may be required to be "personally associated" with each other, such as being "friends" on the Facebook™ platform.

In some embodiments of such a system, the server 1002 may be operable so that an intermediary user may retrieve the Facebook™ IDs of his "friends". For example, the server 1002 may utilize Facebook's Graph API to obtain this ID list, if the proper authorizations by the various parties are in place. Once this "friends" list is obtained, the intermediary user may select all or a subset of these "friends" as message recipients.

In step 13006, the intermediary user 1132 may send product messages to the message recipients selected by the intermediary user in step 13004. Here, the contents of the product messages may, at least in part, be derived from the at least one selected product record 12006 selected in step 13002.

For example, employee agent "Anna Smith" may decide to send product messages based on the "Rory" and the "Gatsby" lines of golf attire that are associated with product container $PC_{men\ luxury}$. As discussed previously, Anna may have selected these product lines using the search filters made available through intermediary user interaction utility 1090. Based on the information that is contained in the product records that correspond to these products, Anna may craft appropriate product messages, perhaps, showing images of each product and the corresponding pricing information. Once these steps are done, Anna may send these product messages to the product recipients selected in step 13004. The employee agent "Bob Smith" may follow a similar procedure to reach his own recipients, and the system may or may not have a mechanism to ensure that different intermediary users do not send the same recipient, product messages regarding the same product.

The commercial user may be interested in knowing information regarding the product messages that were sent to recipients by the intermediary users. For example, this may help the commercial user to determine the selection and message sending process of intermediary users, the popularity of various products with the various intermediary users, and information regarding the recipients of the product messages having information about a particular product (e.g. how many recipients received product messages about the "Regal" line of suits in Canada).

More formally, referring to FIGS. 1 and 12, the server 1002 may provide a feature for commercial user 1130 to track information regarding the plurality of product messages 12002 sent to the plurality of message recipients 12004. Specifically, the server 1002 may provide a message tracking module 1017 that is operable by commercial user 1130 to obtain tracking information 12008, regarding the one or more product messages 12002, via the commercial computing device 1040 of the commercial user 1130.

In some embodiments, the tracking information 12008 is derived from each message in the plurality of product messages 12002, and may include, for each message sent, an identity of the intermediary user that sent that product message, the product information send in the product message, and the message recipient's electronic contact information.

The commercial user 1130 may request and review the tracking information 12008 through the commercial user interaction utility 1060 of commercial computing device 1040. The requests for information may be routed through the commercial user interaction utility 1060 through network 1030 to the message tracking module 1017 on the server 1002.

Figure 14:
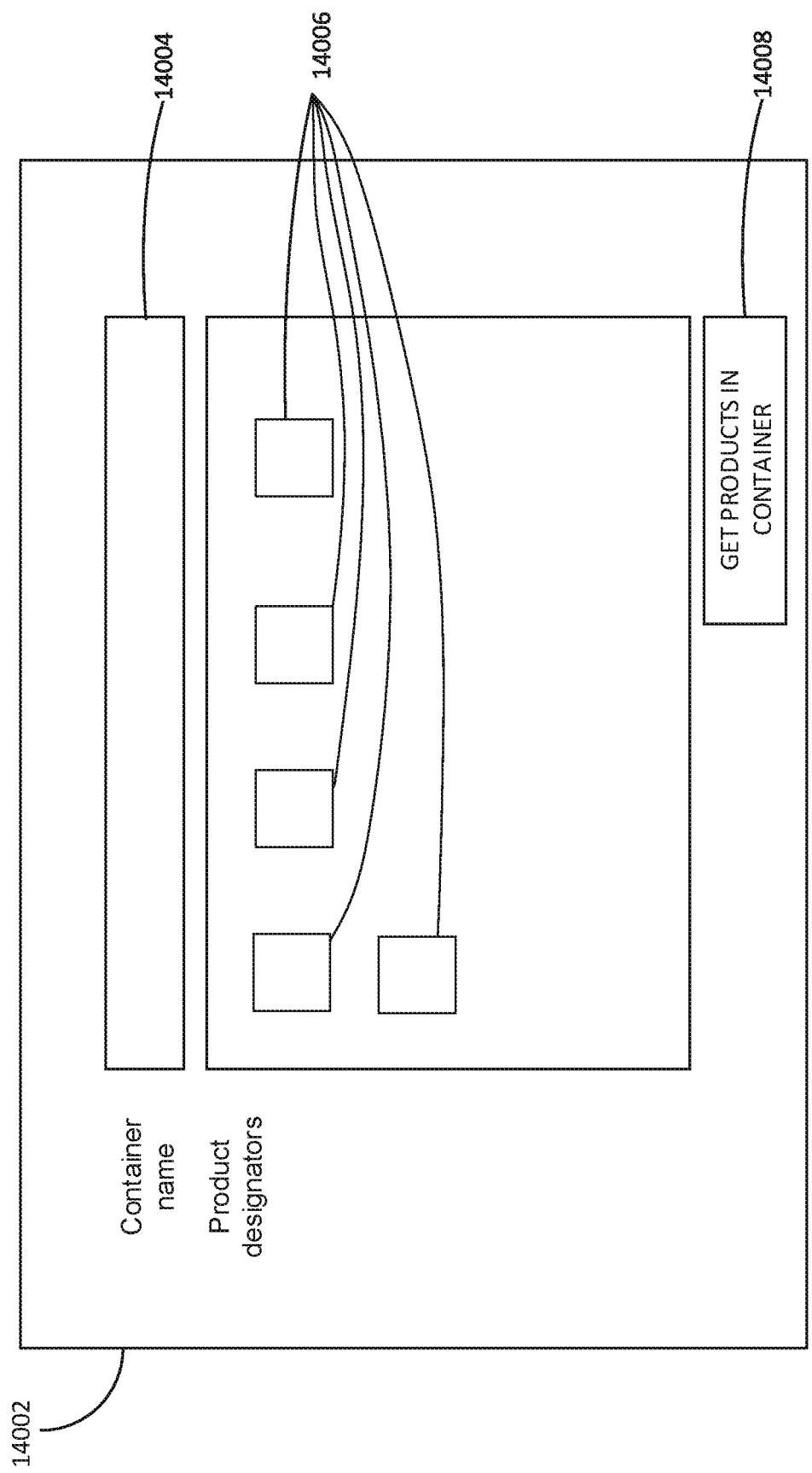
FIG. 14 is a graphical representation of a display provided to obtain product designators in a container.

In one aspect, the commercial user 1130 may desire tracking information 12008 regarding a particular product in product container 6002. To facilitate such a request, the commercial computing device 1040 may display a product designator window 14002, as shown in FIG. 14, on the commercial display 1049.

In response to the commercial user 1130 interacting with the product designator window 14002, for example by clicking on button 14008, the message tracking module 1017 may instruct the commercial user interaction utility 1060 of commercial computing device 1040 to display a plurality of product designators 14006 on the product designator window 14002, where each product designator in the plurality of product designators 14006 references a product in product container 6002 designated by container designator 14004.

For example, if the commercial user enters the container designator "PC5" in field 14004 and clicks on button 14008, the product designator window 14002 may be populated with the product designators 14006 for the "Regal" and "Gatsby" lines of suits.

When commercial user 1130 interacts with one of these product designators 14006 (e.g. by clicking on the product designator corresponding to the "Regal" product), the server 1002 may receive a commercial user interaction, having information related to this queried product designator.

Figure 15:
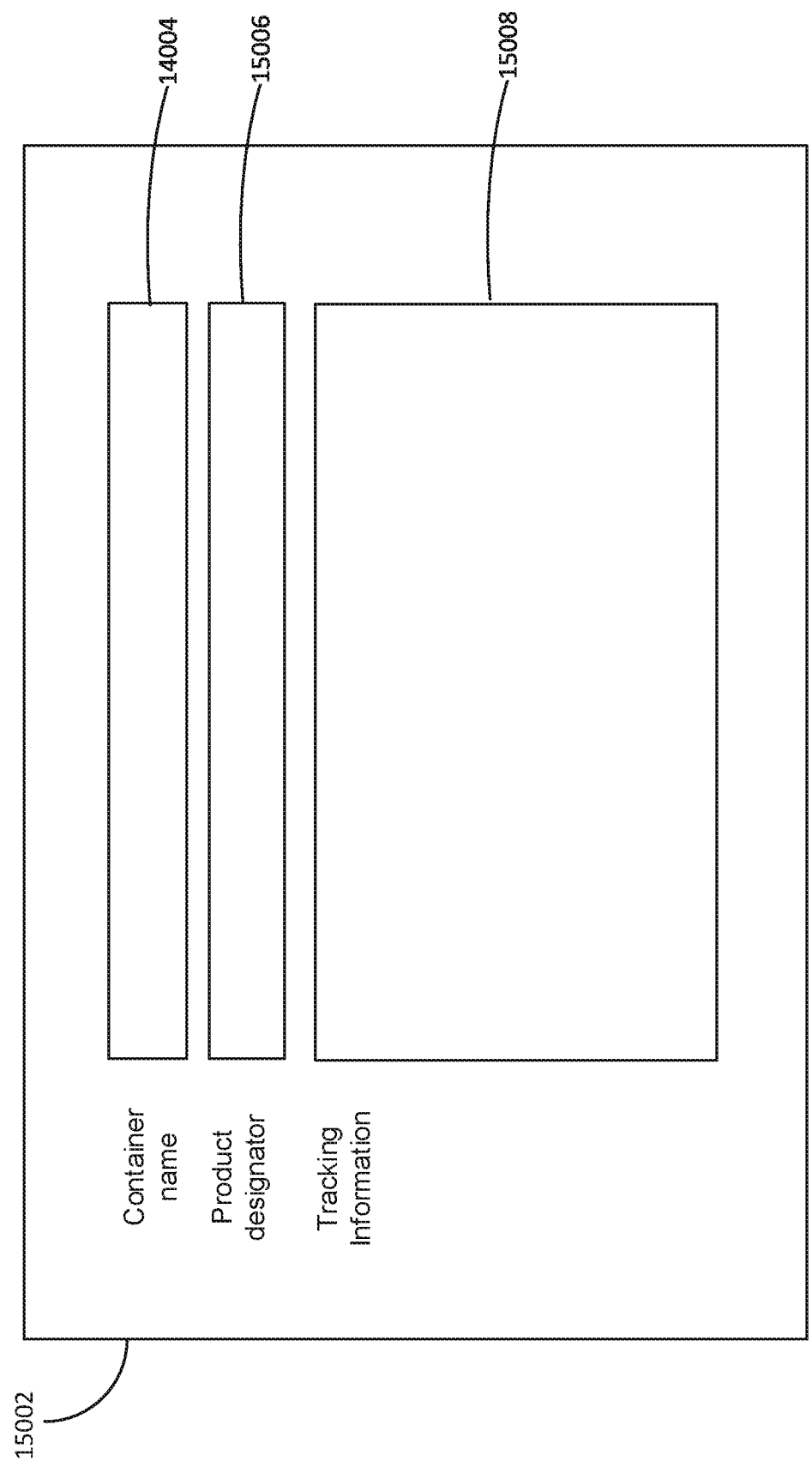
FIG. 15 is a graphical representation of a display provided to obtain product tracking information.

In response, as shown in FIG. 15, the message tracking module 1017 may instruct the commercial user interaction utility 1060 to display queried product window 15002 on commercial display 1049, displaying queried product information 15008 derived from the product record designated by the queried product designator 15006. This queried product information 15008 may be derived from a subset of product messages in the plurality of product messages 12002, where each message in the subset of product messages includes product information derived from the product record designated by the queried product designator 15006.

For example, the fashion house/commercial user may be interested in the number of product messages that have been sent to message recipients having information about the "Regal" product. Moreover, the commercial user may also be interested in the geographical focus of such messages (e.g. percent of product messages sent to New York customers). The commercial user may interact with the queried product window 15002 to filter the types of information to be displayed during each query and/or he may specify beforehand the types of information that he wishes to see upon such a query.

Figure 16:
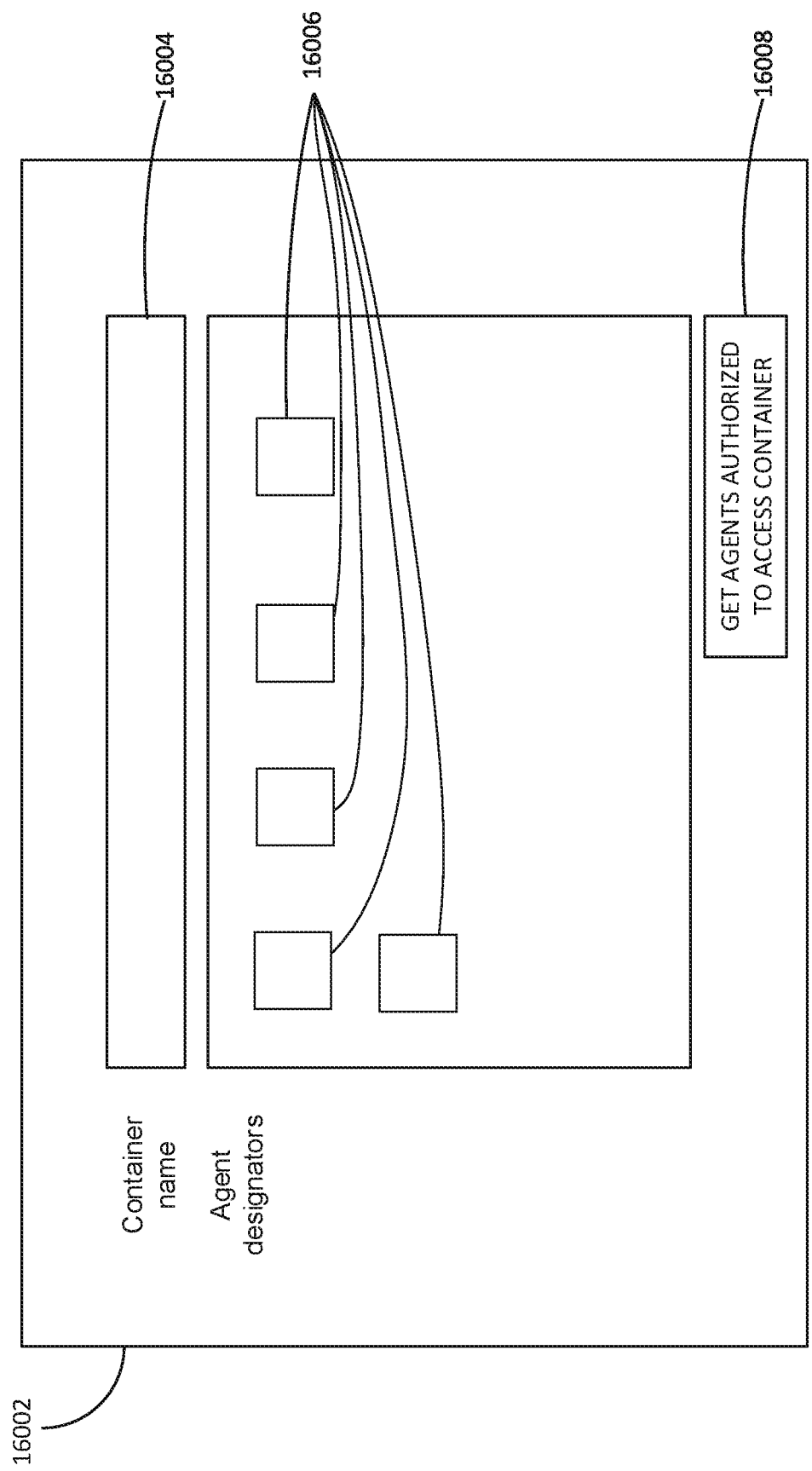
FIG. 16 is a graphical representation of a display provided to obtain intermediary user designators in a container.

In another aspect, the commercial user 1130 may desire information regarding an intermediary user in the plurality of intermediary users 6010 with authorization to access product container 6002, and who have sent product messages in the plurality of product messages 12002. To facilitate such a request, the commercial computing device 1040 may display an intermediary user designator window 16002 as shown in FIG. 16, on the commercial display 1049.

In response to the commercial user 1130 interacting with the intermediary user designator window 16002, for example by clicking on button 16008, the message tracking module 1017 may instruct the commercial user interaction utility 1060 of commercial computing device 1040 to display a plurality of intermediary user designators 16006 on the intermediary user designator window 16002, where each intermediary user designator in the plurality of intermediary user designators 16006 references an intermediary user authorized to access product container 6002 designated by container designator 16004.

For example, if the commercial user enters the container designator "PC5" in field 16004 and clicks on button 16008, the intermediary user designator window 16002 may be populated with the intermediary user designators 16006 for employee agents "Bob Smith" and "Anna Roberts".

When commercial user 1130 interacts with one of these intermediary user designators 16006, the server 1002 may receive a commercial user interaction, having information related to this intermediary user designator.

Figure 17:
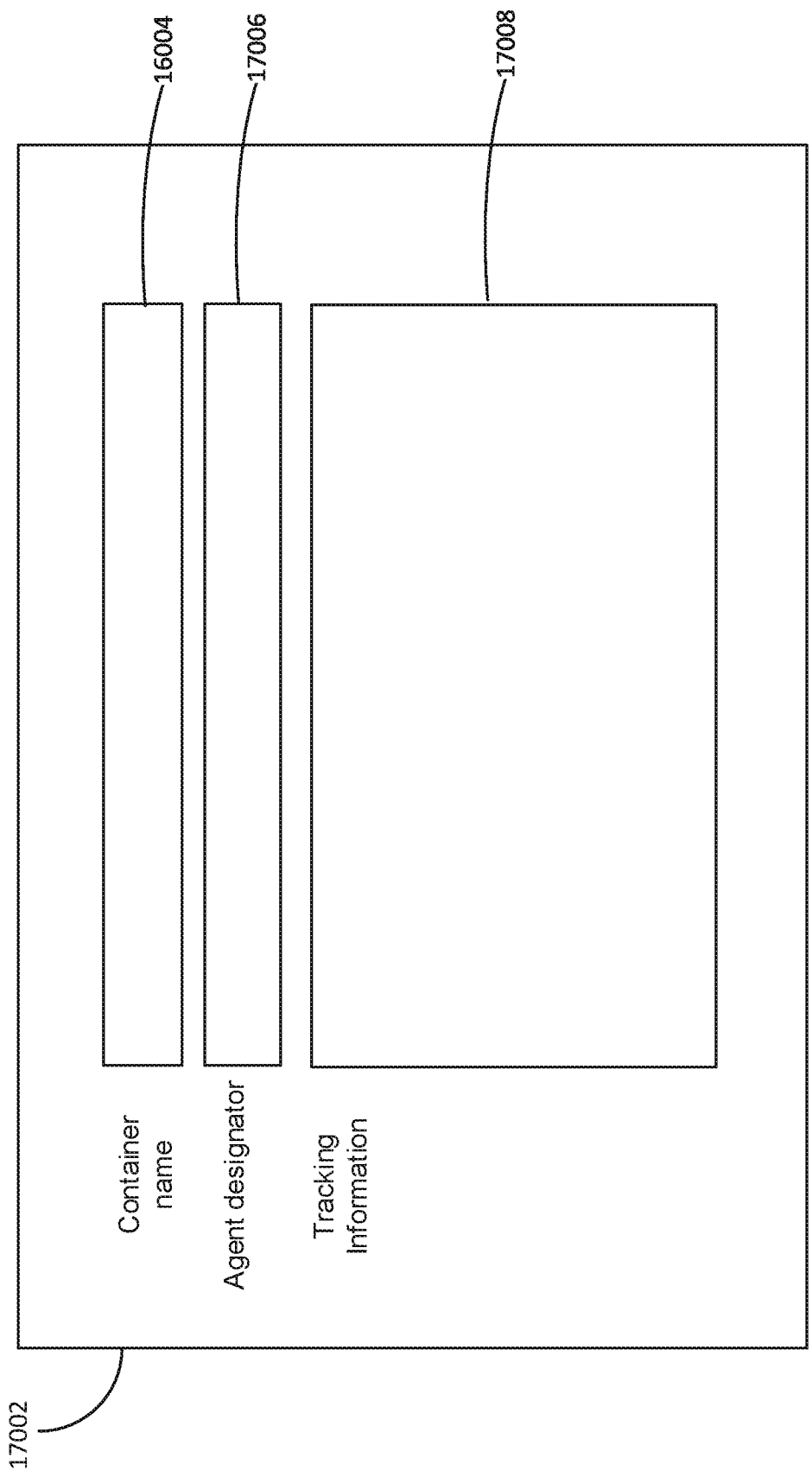
FIG. 17 is a graphical representation of a display provided to obtain intermediary user tracking information.

In response, as shown in FIG. 17, the message tracking module 1017 may instruct the commercial user interaction utility 1060 to display queried intermediary user window 17002 on commercial display 1049, displaying queried intermediary user information 17008 derived from the intermediary user record designated by the queried intermediary user designator 17006. This queried intermediary user information 17008 may be derived from a subset of product messages in the plurality of product messages 12002, where each message in the subset of product messages was sent by the intermediary user designated by the queried intermediary user designator 17006.

For example, the fashion house/commercial user may be interested in the number of product messages that have been sent by employee agent "Anna Roberts" to message recipients. Moreover, the commercial user may also be interested in the geographical focus of such messages (e.g. percent of product messages sent to Toronto customers). The commercial user may interact with the queried intermediary user window 17002 to filter the types of information to be displayed during each query and/or he may specify beforehand the types of information that he wishes to see upon such a query.

In some embodiments, the commercial user interaction utility 1060 may display tracking information regarding multiple intermediary users on the same window, to facilitate easier comparison of those intermediary users by the commercial user. In such an embodiment, a modified version of the queried intermediary user window 17002 may include a split frame view, where each frame contains information substantially similar to the content shown in queried intermediary user window 17002 for a particular intermediary user. For example, such a split frame window may display tracking information about employee agents "Anna Roberts" and "Bob Smith" side-by-side for easier review by the commercial user.

Further to determining information about the product messages sent, it may also be beneficial for the commercial user to obtain information regarding the interactions of the recipients with these sent messages. For example, if "Anna Roberts" utilizes system resources to send product messages about high-end men's clothes to Zimbabwe (one of the poorest countries of the world), without knowing further information about the degree of interaction with such product messages in Zimbabwe, the commercial user may be tempted to draw a negative inference about "Anna Roberts" regarding her effectiveness. However, if this country, in spite of the general poverty, does have many customers that are interested in expensive clothes, her strategy may be justified. However, this information may require the evaluation of the actual interaction between message recipients and the product messages.

Therefore, it may be beneficial for a commercial user 1130 to have the ability to monitor interactions of the plurality of message recipients 12004 with the plurality of product messages 12002 that are sent to the plurality of message recipients 12004. In may be particularly useful if the information that is obtained through such monitoring provides specific details regarding the interaction.

For example, knowing that an interested recipient in the plurality of message recipients 12004 simply "interacted" with a product message, without anything further, may not be as useful as also knowing the content of the product message with which the interested recipient interacted, or knowing which employee agent sent the message with which the interested recipient interacted.

This functionality may be provided by the message processing module 1018 of server 1002. In some aspect, while the message tracking module 1017 ascertains information related to the sending of product messages, the message processing module ascertains information based on an actual interaction of a product message with a message recipient 1134 in the plurality of message recipients 12004. In some embodiments, the scope of these two modules (as with other modules in server 1002) may overlap, and may logically be a single module.

Figure 18:
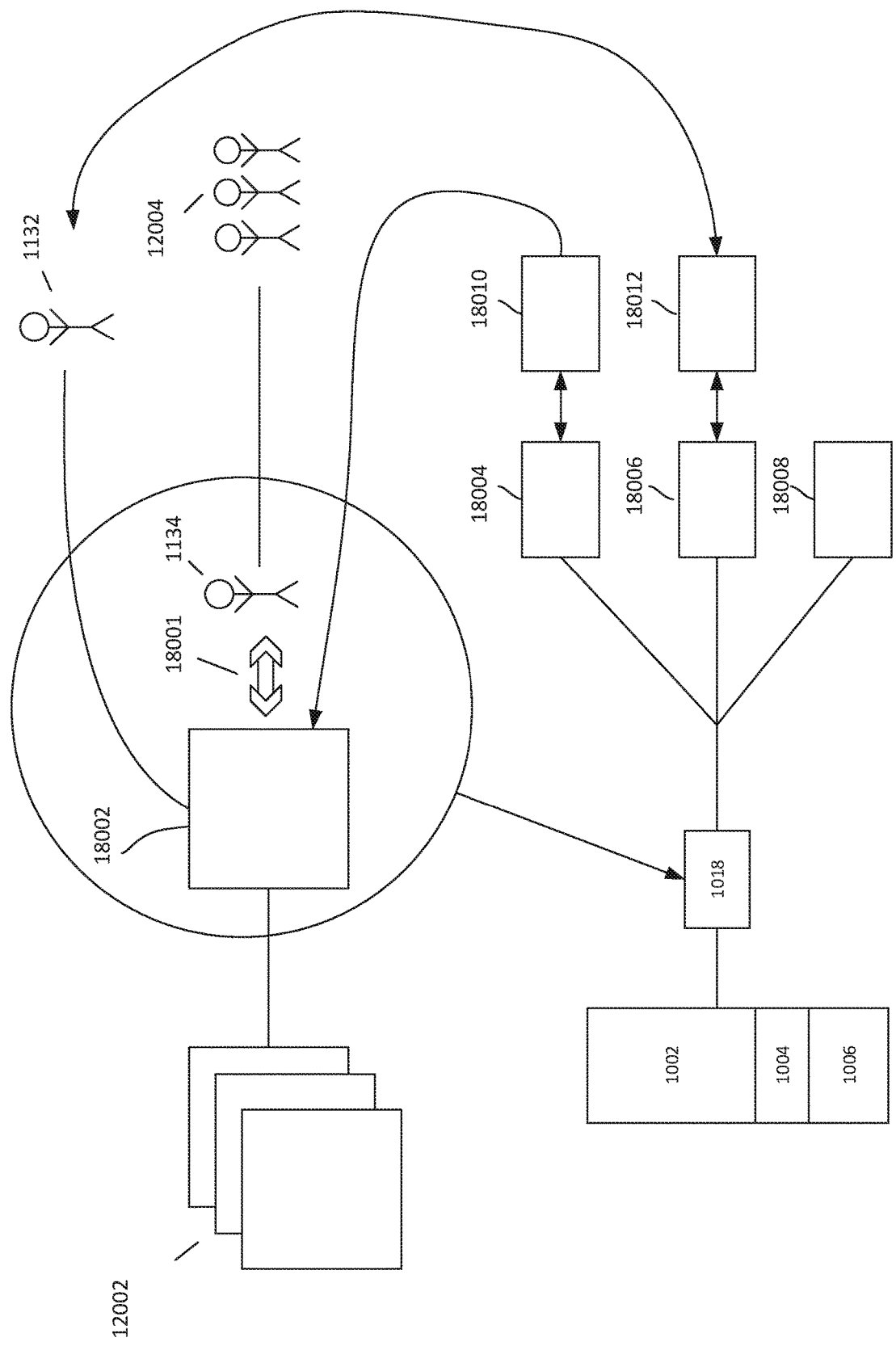
FIG. 18 illustrates a functionality of the message processing module.

In this regard, referring to FIG. 18, the message processing module 1018 of the server 1002 may, in response to an interaction 18001 between a message recipient 1134 in the plurality of message recipients 12004 and a product message 18002 in the plurality of product messages 12002, ascertains at least one of 1) a product identifier 18004 linked to a product record 18010 in the plurality of product records 6008, wherein product message 18002 includes product information derived from product record 18010 or 2) an intermediary user identifier 18006 linked to an intermediary user record 18012 in the plurality of intermediary user records 6012, wherein intermediary user record 18012 stores information about intermediary user 1132 and product message 18002 is sent by intermediary user 1132 to the message recipient 1134.

The message processing module 1018 may also determine an indication of the message recipient 18008, vis-à-vis message recipient 1134, or this information may already be available to server 1002. For example, the indication of the message recipient 18008 may be an IP address such as 41.190.32.5 that is associated with message recipient 1134, which may be tied to a country such as "Zimbabwe" in the example above. Alternatively, the indication of the interested recipient may be an email address such as bob1234@gmail.com. It is important to note that a particular indication of a message recipient may be unique vis-à-vis other message recipients (e.g. email address), or it may not be unique (e.g. IP address at a university).

The message processing module may also store the indication of the message recipient 1134 on the data storage module 1020 in association with the product identifier and/or the intermediary user identifier. As discussed previously, this may allow the server 1002 to report to the commercial user 1130 useful information regarding the interested recipient, specifically, information regarding one or more product records that provided content for the product message with which the interested recipient interacted, and/or the intermediary user that sent the message with which the interested recipient interacted.

For example, the commercial user 1130 may be very interested in knowing that "Anna Roberts" has had significant success in convincing message recipients in African countries to "click-through" and purchase women's clothes, while intermediary user "Bob Smith" has had better success with men's clothes. Armed with this information, the commercial user 1130 may re-allocate the products allocated between "Anna Roberts" and "Bob Smith" in system 1000.

In some embodiments, this re-allocation by the employer company through the commercial user interaction utility 1060 may be accomplished by the employer company revoking Anna's access to the men's luxury clothes container. This may force Anna to spend more time with marketing women's clothes and Bob may have more opportunities to market men's clothes. In another embodiment, the fashion house may place controls on Anna's ability to select potential customers, for example, by limiting her ability to select potential male customers in North America, to encourage her to send messages to potential female customers located in Africa. This may indirectly force Anna to focus more time on marketing women's clothes instead of men's clothes, and on marketing in Africa as opposed elsewhere.

In another embodiment, the commercial user interaction utility 1060 may allow the commercial user/fashion house to specify a maximum number of messages that an employee agent may send to potential customers regarding products of a particular container. With such a scheme, in the example discussed above, the fashion house may increase the limit of product messages that Anna may send regarding products in the women's clothes container, while decreasing the number of messages that she may send out regarding products in the men's clothes container. Since the system may also have mechanisms in place to ensure that a particular potential customer/recipient does not receive multiple messages about the same product from different employee agents of the commercial user, this may also indirectly allow "Bob Smith" to reach more potential customers regarding products in the men's clothes container.

Ensuring that a potential customer/message recipient does not receive multiple messages about the same product from different employee agents of the commercial user, possibly within a certain time window, may be performed in many ways. One approach may be for the server 1002 to exercise a "first come first serve" approach. With this approach, the first employee agent to send a product message, having information about a particular product to a particular recipient within a particular time window, may be successful in sending that message, while other product messages about the same product to the same recipient may fail. For example, "Satya Nadella" may be a potential customer that both "Anna Roberts" and "Bob Smith" (employee agents) desire to communicate with, regarding the "Regal" line of suits of the fashion house/employer company. The fashion house may specify that within a "running" one month time window, a potential customer should only get one message regarding a particular product, when all the messages sent by all the intermediary users are considered together. In this case, if "Anna Roberts" sends a product message about the "Regal" line of suits to "Satya Nadella" successfully, "Bob Smith" may be prevented from sending a separate message to "Satya Nadella" about the same product, at least until one month has elapsed from the time that "Anna Smith" sent her product message. To accomplish this, the message sending module 1016 may maintain a record of: 1) a product identifier that identifies the product described in the product message, 2) a recipient identifier that identifies the message recipient of the product message, and 3) the time of sending the message, for each product message sent successfully to a message recipient. When a different (or same) employee agent, attempts to send another message about the same product to the same recipient within the blocked time window (e.g. one month), the message sending module 1016 may block that subsequent request.

Another embodiment to ensure that a message recipient does not receive duplicate/similar messages about the same product within a particular time window may involve the server 1002 exercising an "optimal sender" approach, as opposed to a "first come first serve" approach. With this approach, the various intermediary users may request the server 1002 to send product messages about a particular product to a product recipient, and the message sending module 1016, with information from the statistical tracking utility 1008, may accept the most "optimal" request and deny all others, even if the message sent is not the "first" request received by the message sending module 1016. For example, as in the previous example, assume that "Anna Roberts" sends her request first to server 1002, regarding the product message to "Satya Nadella" about the "Regal" line of suits. Even if "Bob Smith" sends his corresponding request two days later, the product message by "Bob Smith" may be sent to "Satya Nadella" and the product message by "Anna Roberts" may be denied. This may be accomplished by the message sending module 1016 queuing all send requests, and only making a determination after the expiration of a decision making time window.

When the message sending module 1016 receives the request from "Anna Roberts", it may record the 1) product identifier and 2) the recipient identifier, as in the previous example, but may defer sending the product message until a decision making time window (e.g. three days) has elapsed. In this time window, if another request to send a product message about the same product to the same recipient arrives, the message sending module 1016 may evaluate both messages at the expiration of the decision making time window, to decide which of the messages should be sent to the requested product recipient. In making this decision, the message sending module 1016 may consider other information, such as past sales statistics obtained from the statistical tracking utility 1008. The decision may not be purely based on the highest likelihood of a sale, but may also consider other factors as "load balancing". For example, the message sending module 1016 may want to ensure that the employer company does not become overly dependent on a particular intermediary user (e.g. "Bob Smith") in a particular region, but may desire to spread any goodwill over many intermediary users. This may help the employer company to hedge against a particularly influential employee agent from simply leaving the company.

It may be possible that a subset of the message recipients in the plurality of message recipients 12004 do not receive a message directly from an intermediary user in the plurality of intermediary users 6010. It is possible that this subset of message recipients receive corresponding messages from one or more other message recipients in the plurality of recipients.

Figure 19:
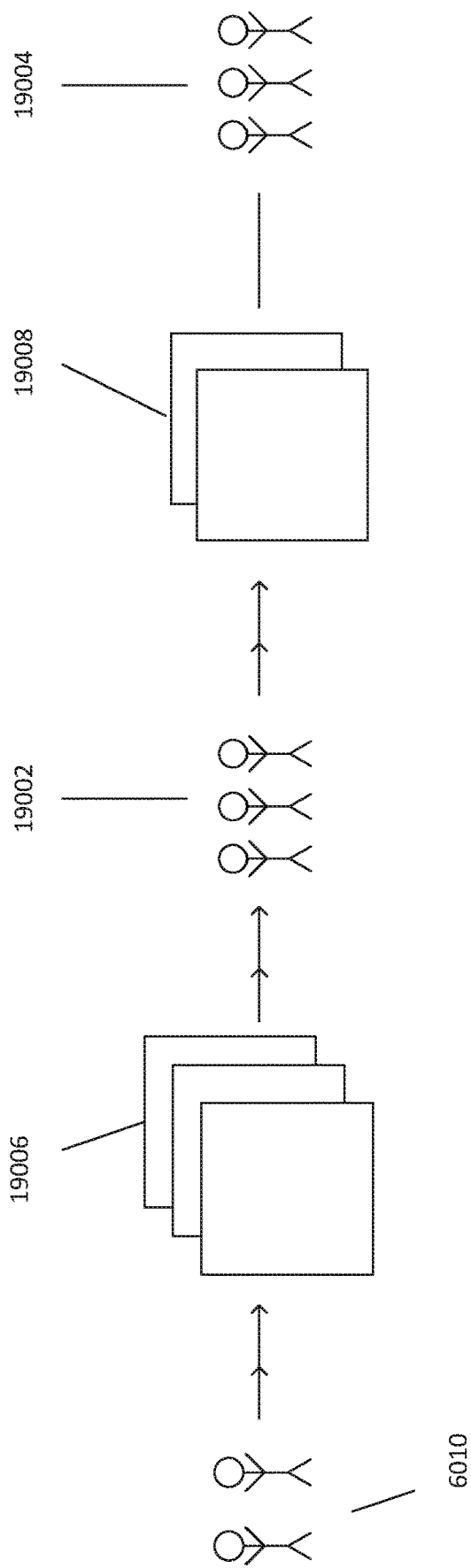
FIG. 19 is a graphical representation of downstream recipients and downstream product messages.

Referring to FIG. 19, the plurality of product messages includes one or more direct product messages 19006 and one or more downstream product messages 19008. Each direct product message in the one or more direct product messages 19006 is sent by an intermediary user in the plurality of intermediary users 6010 to a direct recipient in the one or more direct recipients 19002. Each downstream product message in the one or more downstream product messages is sent by a direct recipient in the one or more direct recipients 19002 to a downstream recipient in the one or more downstream recipients 19004. Both the one or more direct recipients 19002 and the one or more downstream recipients 19004 are in the plurality of recipients.

Moreover, each downstream product message in the one or more downstream product messages 19008 has a corresponding direct product message in the one or more direct product messages 19006, and the content of that downstream product message is based the corresponding direct product message. Each such corresponding pair of messages may be identical to each other, substantially identical to each other, or may only relate with respect to some relevant attribute, such as information about a particular product described in the product message.

For example, employee agent "Bob Smith" may send product messages to "Noah", "Jimmy", and "cord" regarding the "Regal" product. "Noah" may decide to forward this message (e.g. email) to "Cam". In this scenario, "Cam" did not receive the message directly from "Bob Smith", and as such, he is a downstream recipient, while "Noah" is a direct recipient. This distinction may be very useful, for example, if "Noah" is prolific at forwarding product messages to promising customers. When these downstream promising customers, such as "Cam", click-through to purchase an item, "Bob Smith" and/or the commercial user may see the value brought to the network by "Noah", and may make good use of that information.

As discussed earlier, intermediary user 1132 may not necessarily be an internal employee sales/marketing agent of the employer company. Furthermore, it may also be possible that intermediary user 1132 utilizing intermediary computing device 1070 is a non-human expert system intermediary user. Such an expert system may be an external computer-implemented component that communicates with server 1002 via intermediary communication module 1014 of the server 1002. In this regard, the intermediary user interaction utility 1090 may represent an Application Programming Interface (API) that can be leveraged by the external computer-implemented component to communicate with server 1002.

It should also be noted that some of the approaches described above may also be complementary to technical anti-spam mechanisms and/or legal anti-spam provisions that exist to eliminate undesirable messages from being delivered to the recipient. For example, a product recipient (e.g. "Satya Nadella") may not desire to receive unsolicited correspondence regarding the products that are being advertised by the various commercial users. To this end, he may instruct his email client to block all such correspondence using the various email filter technologies that are well-known in the art. Given the specific laws applicable to his jurisdiction and/or the jurisdiction(s) where the server 1002 is located, the intermediary users using server 1002 may even be legally barred from sending messages to "Satya Nadella", unless the sending intermediary user has an existing relationship with or some other form of permission from the recipient.

Assuming, based on prior experience, "Satya Nadella" has come to trust the recommendations of "Anna Roberts" regarding high-end men's clothing, he may have given Anna explicit permission to send him product messages. For example, this may be accomplished by adding a specific rule in his email client to receive messages from Anna and also acknowledging that Anna has permission to communicate with him. This can help to ensure that Satya is informed of the products being marketed by the fashion house, but that he will only receive messages from individuals that he trusts.

Moreover, this trust/permission information may be one of many other factors that may be considered by the message sending module 1016 in determining which message to send in the "optimal sender" approach discussed previously.

It should also be noted that "earning trust" or "requiring explicit permission", as discussed above, may not be required in all cases. As previously discussed, message recipients may simply be personal contacts of the intermediary user. In some embodiments, the server 1002 may be operable so that an intermediary user may retrieve the Facebook™ IDs of the intermediary user's "friends", perhaps utilizing Facebook's Graph API. Once this "friends" list is obtained, the intermediary user may select all or a subset of these "friends" as message recipients.

A similar approach may be easily adapted to sending message through email as well. For example, the server 1002 may request access to the intermediary user's personal email account credentials (similar to a smartphone requesting such access) and may automatically retrieve all of the intermediary user's "email contacts" as potential message recipients.

As described previously, the intermediary user may now select the desired message recipients within the system 1000, and when server 1002 sends messages to these message recipients utilizing the intermediary user's personal credentials, the technical anti-spam filters and the legal anti-spam provisions may not be invoked, since the recipients are personal contacts of the sending intermediary user. These "direct recipients" may similarly send the message to their own personal contacts (through system 1000 or manually), and the subsequent "downstream recipients" may do the same. This may in effect create a "fan out" effect of propagating the advertising message organically, while minimizing the triggering of technical anti-spam filters and legal anti-spam provisions.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method of operating at least one computer server, the method comprising:
   configuring a processor of the at least one computer server to authenticate a commercial user;
   storing a plurality of product records on a data storage module, wherein the plurality of product records stores information regarding a plurality of products such that for each product in the plurality of products, a corresponding product record in the plurality of product records stores information regarding that product;
   storing a plurality of intermediary user records on the data storage module for the commercial user, wherein the plurality of intermediary user records stores information regarding a plurality of intermediary users such that for each intermediary user in the plurality of intermediary users, a corresponding intermediary user record in the plurality of intermediary user records stores information regarding that intermediary user;
   configuring the processor of the at least one computer server to provide a message sending module operable by the plurality of intermediary users to send a plurality of product messages to a plurality of recipients such that for each intermediary user in the plurality of intermediary users, the message sending module is operable by that intermediary user to i) select at least one selected product record from the plurality of product records, ii) specify recipient electronic contact information for at least one selected recipient in the plurality of recipients, iii) generate a send request for sending a product message comprising product information derived from the at least one selected product record to the at least one selected recipient, the send request being associated with that intermediary user; and configuring the processor to provide a message tracking module operable by the commercial user via a commercial user device for that commercial user, the message tracking module being operable by the commercial user to provide tracking information regarding the plurality of product messages via the commercial user device, wherein the tracking information is derived at least partly based on interactions of the plurality of recipients with the plurality of product messages;

wherein, when multiple intermediary users in the plurality of intermediary users have, within a decision making time window, selected at least one product record from the plurality of product records and generated multiple send requests for sending product information derived from that at least one product record to the same recipient, the message sending module is further operable to iv) update a request queue to include the multiple send requests, each send request of the multiple send requests originating from an intermediary user in the multiple intermediary users, v) subsequent to the decision making time window, identify a single send request from the request queue based on predetermined criteria, wherein the predetermined criteria comprise, for each intermediary user of the multiple intermediary users, trust/permission information regarding permission for communication from that intermediary user to the at least one selected recipient stored in at least one antispam filler of the at least one selected recipient, vi) send the product message associated with the identified single send request to the at least one selected recipient, wherein the product message associated with the identified single send request is receivable without triggering the at least one antispam filter of the at least one selected recipient, and vii) to not send the product message associated with any of the multiple send requests other than the identified single send request to the at least one selected recipient.

2. The method as defined in claim 1 wherein
the message tracking module comprises a product message tracking window, the processor being further configured to display the product message tracking window on a commercial user display of the commercial user device; and
the message tracking module being operable to display the tracking information by, in response to the commercial user interacting with the product message tracking window, i) displaying a plurality of product designators via a commercial user interface on the commercial user display, wherein each product designator in the plurality of product designators designates a product record in the plurality of product records, ii) receiving at least one commercial user interaction with a queried product designator in the plurality of product designators, iii) in response to receiving the at least one commercial user interaction, displaying queried product information for the product record designated by the queried product designator via the commercial user display, wherein the queried product information is derived from a number of product messages in the plurality of product messages wherein each message in the number of queried product messages includes product information derived from the product record, the number of queried product messages being zero or a positive integer less than a cardinality of the plurality of product messages.

3. The method as defined in claim 1 wherein
the message tracking module comprises an intermediary message tracking window, the processor being further configured to display the intermediary message tracking window via a commercial user interface on a commercial user display of the commercial user device; and
the message tracking module being operable to display the tracking information by, in response to the commercial user interacting with the intermediary message tracking window i) displaying a plurality of intermediary user designators via a commercial user interface on the commercial user display, wherein each intermediary user designator in the plurality of intermediary user designators designates an intermediary user record in the plurality of intermediary user records and an intermediary user in the plurality of intermediary users, wherein the intermediary user record stores information regarding the intermediate user, ii) receiving at least one commercial user interaction with a queried intermediary user designator in the plurality of intermediary user designators, iii) in response to receiving the at least one commercial user interaction, displaying queried intermediary user information for the intermediary user designated by the queried intermediary user designator via the commercial user display, wherein the queried intermediary user information is derived from a number of queried intermediary user messages in the plurality of product messages wherein each message in the number of queried intermediary user messages is sent by the intermediary user, the number of queried intermediary user messages being zero or a positive integer less than a cardinality of the plurality of product messages.

4. The method as defined in claim 1, wherein the tracking information comprises, for each message in the plurality of product messages, an identity of the intermediary user that sent that product message, and at least one of the product information derived from the at least one selected product record, and the recipient electronic contact information for the at least one selected recipient.

5. The method as defined in claim 1 further comprising configuring the processor to display a product control window via the commercial user interface on the commercial user display, wherein the product control window is controllable by the commercial user to modify the plurality of product records according to at least one interaction of the commercial user with the product control window.

6. The method as defined in claim 5, wherein to modify the plurality of product records according to the at least one interaction of the commercial user with the product control window includes at least one of
to add to the plurality of product records by adding a newly approved product record to the plurality of product records, wherein the newly approved product record stores information regarding a newly approved product and the newly approved product is added to the plurality of products when the newly approved product record is added to the plurality of product records; and to remove a formerly approved product record from the plurality of product records, wherein the formerly approved product record stores information regarding a formerly approved product and the formerly approved product is removed from the plurality of products when the formerly approved product record is removed from the plurality of product records.

7. The method as defined in claim 1 further comprising configuring the processor to display an intermediary control window via the commercial user interface on the commercial user display, wherein the intermediary control window is controllable by the commercial user to modify the plurality of intermediary user records according to at least one interaction of the commercial user with the intermediary control window.

8. The method as defined in claim 7, wherein to modify the plurality of intermediary user records according to the at least one interaction of the commercial user with the intermediary control window includes at least one of
  to add to the plurality of intermediary user records by adding a newly approved intermediary user record to the plurality of intermediary user records, wherein the newly approved intermediary user record stores information regarding a newly approved intermediary user and the newly approved intermediary user is added to the plurality of intermediary users when the newly approved intermediary user record is added to the plurality of intermediary user records; and
  to remove a formerly approved intermediary user record from the plurality of intermediary user records, wherein the formerly approved intermediary user record stores information regarding a formerly approved intermediary user and the formerly approved intermediary user is removed from the plurality of intermediary users when the formerly approved intermediary user record is removed from the plurality of intermediary user records.

9. The method as defined in claim 1 further comprising configuring the processor of the at least one computer server to provide a message processing module for monitoring interactions of the plurality of recipients with the plurality of product messages, wherein in response to an interaction between an interested recipient in the plurality of recipients and a corresponding product message in the plurality of product messages, the message processing module is operable to:
  a) ascertain at least one of
    i) a product identifier linked to a product record in the plurality of product records, wherein the corresponding product message includes product information derived from that product record; and
    ii) an intermediary user identifier linked to an intermediary user in the plurality of intermediary users, wherein the corresponding product message is sent by the intermediary user; and
  b) store an indication of the interested recipient on the data storage module in relation to at least one of the product identifier and the intermediary user identifier, wherein the tracking information regarding the plurality of product messages depends, at least in part, on the indication of the interested recipient.

10. The method as defined in claim 9, wherein the plurality of product messages includes one or more downstream product messages, wherein each product message in the one or more downstream product messages is sent by a direct recipient in one or more direct recipients to a downstream recipient in one or more downstream recipients, wherein the plurality of recipients includes the one or more direct recipients and the one or more downstream recipients, and the direct recipient is not in the one or more downstream recipients.

11. The method as defined in claim 1, wherein the plurality of intermediary users includes one or more expert system intermediary users, wherein each expert system intermediary user in the one or more expert system intermediary users is an external computer implemented component that communicates with the at least one computer server via an intermediary communication module of the at least one computer server.

12. A commercial user audit system comprising:
  a data storage module having stored thereon:
    a plurality of product records, wherein the plurality of product records stores information regarding a plurality of products such that for each product in the plurality of products, a corresponding product record in the plurality of product records stores information regarding that product; and
    a plurality of intermediary user records for the commercial user, wherein the plurality of intermediary user records stores information regarding a plurality of intermediary users such that for each intermediary user in the plurality of intermediary users, a corresponding intermediary user record in the plurality of intermediary user records stores information regarding that intermediary user; and
  a hardware processor unit being configured for:
    providing an authentication module for authenticating the commercial user;
    providing a message sending module operable by the plurality of intermediary users to send a plurality of product messages to a plurality of recipients such that for each intermediary user in the plurality of intermediary users, the message sending module is operable by that intermediary user to i) select at least one selected product record from the plurality of product records, ii) specify recipient electronic contact information for at least one selected recipient in the plurality of recipients, iii) generate a send request for sending a product message comprising product information derived from the at least one selected product record to the at least one selected recipient, the send request associated with that intermediary user; and
    providing a message tracking module operable by the commercial user via a commercial user device for that commercial user, the message tracking module being operable by the commercial user to provide tracking information regarding the plurality of product messages via the commercial user device, wherein the tracking information is derived at least partly based on interactions of the plurality of recipients with the plurality of product messages;
    wherein, when multiple intermediary users in the plurality of intermediary users have, within a decision making time window, selected at least one product record from the plurality of product records and generated multiple send requests for sending product information derived from that at least one product record to the same recipient, the message sending module is further operable to iv) update a request queue to include the multiple send requests, each send request of the multiple send requests originating from an intermediary user in the multiple intermediary users, v) subsequent to the decision making time window, identify a single send request from the request queue based on predetermined criteria, wherein the predetermined criteria comprise, for each intermediary user of the multiple intermediary users, trust/permission information regarding permission for communication from that intermediary user to the at least one selected recipient stored in at least one anti-spam filler of the at least one selected recipient, vi) send the product message associated with the identified send request to the at least one selected recipient, wherein the product message associated with the identified single send request is receivable without triggering the at least one anti-spam filter of the at least one selected recipient, and vii) to not send the product message associated with any of the multiple send requests other than the identified single send request to the at least one selected recipient.

13. The system as defined in claim 12, wherein
the message tracking module comprises a product message tracking window, the processor being further configured to display the product message tracking window on a commercial user display of the commercial user device; and
the message tracking module being operable to display the tracking information by, in response to the commercial user interacting with the product message tracking window, i) displaying a plurality of product designators via a commercial user interface on the commercial user display, wherein each product designator in the plurality of product designators designates a product record in the plurality of product records, ii) receiving at least one commercial user interaction with a queried product designator in the plurality of product designators, iii) in response to receiving the at least one commercial user interaction, displaying queried product information for the product record designated by the queried product designator via the commercial user display, wherein the queried product information is derived from a number of product messages in the plurality of product messages wherein each message in the number of queried product messages includes product information derived from the product record, the number of queried product messages being zero or a positive integer less than a cardinality of the plurality of product messages.

14. The system as defined in claim 12, wherein
the message tracking module comprises an intermediary message tracking window, the processor being further configured to display the intermediary message tracking window via a commercial user interface on a commercial user display of the commercial user device; and
the message tracking module being operable to display the tracking information by, in response to the commercial user interacting with the intermediary message tracking window i) displaying a plurality of intermediary user designators via a commercial user interface on the commercial user display, wherein each intermediary user designator in the plurality of intermediary user designators designates an intermediary user record in the plurality of intermediary user records and an intermediary user in the plurality of intermediary users, wherein the intermediary user record stores information regarding the intermediate user, ii) receiving at least one commercial user interaction with a queried intermediary user designator in the plurality of intermediary user designators, iii) in response to receiving the at least one commercial user interaction, displaying queried intermediary user information for the intermediary user designated by the queried intermediary user designator via the commercial user display, wherein the queried intermediary user information is derived from a number of queried intermediary user messages in the plurality of product messages wherein each message in the number of queried intermediary user messages is sent by the intermediary user, the number of queried intermediary user messages being zero or a positive integer less than a cardinality of the plurality of product messages.

15. The system as defined in claim 12, wherein the tracking information comprises, for each message in the plurality of product messages, an identity of the intermediary user that sent that product message, and at least one of the product information derived from the at least one selected product record, and the recipient electronic contact information for the at least one selected recipient.

16. The system as defined in claim 12, wherein the hardware processor unit is further configured for displaying a product control window via the commercial user interface on the commercial user display, wherein the product control window is controllable by the commercial user to modify the plurality of product records according to at least one interaction of the commercial user with the product control window.

17. The system as defined in claim 16, wherein to modify the plurality of product records according to the at least one interaction of the commercial user with the product control window includes at least one of
to add to the plurality of product records by adding a newly approved product record to the plurality of product records, wherein the newly approved product record stores information regarding a newly approved product and the newly approved product is added to the plurality of products when the newly approved product record is added to the plurality of product records; and
to remove a formerly approved product record from the plurality of product records, wherein the formerly approved product record stores information regarding a formerly approved product and the formerly approved product is removed from the plurality of products when the formerly approved product record is removed from the plurality of product records.

18. The system as defined in claim 12, wherein the hardware processor unit is further configured for displaying an intermediary control window via the commercial user interface on the commercial user display, wherein the intermediary control window is controllable by the commercial user to modify the plurality of intermediary user records according to at least one interaction of the commercial user with the intermediary control window.

19. The system as defined in claim 18, wherein to modify the plurality of intermediary user records according to the at least one interaction of the commercial user with the intermediary control window includes at least one of to add to the plurality of intermediary user records by adding a newly approved intermediary user record to the plurality of intermediary user records, wherein the newly approved intermediary user record stores information regarding a newly approved intermediary user and the newly approved intermediary user is added to the plurality of intermediary users when the newly approved intermediary user record is added to the plurality of intermediary user records; and to remove a formerly approved intermediary user record from the plurality of intermediary user records, wherein the formerly approved intermediary user record stores information regarding a formerly approved intermediary user and the formerly approved intermediary user is removed from the plurality of intermediary users when the formerly approved intermediary user record is removed from the plurality of intermediary user records.

20. The system as defined in claim 12, wherein the hardware processor unit is further configured for providing a message processing module for monitoring interactions of the plurality of recipients with the plurality of product messages, wherein in response to an interaction between an interested recipient in the plurality of recipients and a corresponding product message in the plurality of product messages, the message processing module is operable to:
  a) ascertain at least one of
    i) a product identifier linked to a product record in the plurality of product records, wherein the corresponding product message includes product information derived from that product record; and
    ii) an intermediary user identifier linked to an intermediary user in the plurality of intermediary users, wherein the corresponding product message is sent by the intermediary user; and
  b) store an indication of the interested recipient on the data storage module in relation to at least one of the product identifier and the intermediary user identifier, wherein the tracking information regarding the plurality of product messages depends, at least in part, on the indication of the interested recipient.

21. The system as defined in claim 20, wherein the plurality of product messages includes one or more downstream product messages, wherein each product message in the one or more downstream product messages is sent by a direct recipient in one or more direct recipients to a downstream recipient in one or more downstream recipients, wherein the plurality of recipients includes the one or more direct recipients and the one or more downstream recipients, and the direct recipient is not in the one or more downstream recipients.

22. The system as defined in claim 12, wherein the plurality of intermediary users includes one or more expert system intermediary users, wherein each expert system intermediary user in the one or more expert system intermediary users is an external computer implemented component that communicates with the at least one computer server via an intermediary communication module of the at least one computer server.

23. A computer program product for use on an at least one computer server having a data storage module, the computer program product comprising:
  a non-transitory recording medium; and
  instructions recorded on the non-transitory recording medium for instructing the at least one computer server to perform the steps of:
  authenticating a commercial user;
  storing a plurality of product records on the data storage module, wherein the plurality of product records stores information regarding a plurality of products such that for each product in the plurality of products, a corresponding product record in the plurality of product records stores information regarding that product;
  storing a plurality of intermediary user records on the data storage module for the commercial user, wherein the plurality of intermediary user records stores information regarding a plurality of intermediary users such that for each intermediary user in the plurality of intermediary users, a corresponding intermediary user record in the plurality of intermediary user records stores information regarding that intermediary user;
  providing a message sending module operable by the plurality of intermediary users to send a plurality of product messages to a plurality of recipients such that for each intermediary user in the plurality of intermediary users, the message sending module is operable by that intermediary user to i) select at least one selected product record from the plurality of product records, ii) specify recipient electronic contact information for at least one selected recipient in the plurality of recipients, iii) generate a send request for sending a product message comprising product information derived from the at least one selected product record to the at least one selected recipient, the send request associated with that intermediary user; and
  providing a message tracking module operable by the commercial user via a commercial user device for that commercial user, the message tracking module being operable by the commercial user to provide tracking information regarding the plurality of product messages via the commercial user device, wherein the tracking information is derived at least partly based on interactions of the plurality of recipients with the plurality of product messages;
  wherein, when multiple intermediary users in the plurality of intermediary users have, within a decision making time window, selected at least one product record from the plurality of product messages and generated multiple send requests for sending product information derived from that at least one product record to the same recipient, the message sending module is further operable to iv) update a request queue to include the multiple send requests, each send request of the multiple send requests originating from an intermediary user in the multiple intermediary users, v) subsequent to the decision making time window, identify a single send request from the request queue based on predetermined criteria, wherein the predetermined criteria comprise, for each intermediary user of the multiple intermediary users, trust/permission information regarding permission for communication from that intermediary user to the at least one selected recipient stored in at least one anti-spam filter of the at least one selected recipient, vi) send the product message associated with the identified send request to the at least one selected recipient, wherein the product message associated with the identified send request is received without triggering the at least one anti-spam filter of the at least one selected recipient, and vii) to not send the product message associated with any of the multiple send requests other than the identified send request to the at least one selected recipient.

* * * * *